(12) United States Patent
Harvill et al.

(10) Patent No.: US 6,559,845 B1
(45) Date of Patent: May 6, 2003

(54) THREE DIMENSIONAL ANIMATION SYSTEM AND METHOD

(75) Inventors: Young Harvill, San Mateo, CA (US); Richard Bean, Cupertino, CA (US)

(73) Assignee: Pulse Entertainment, San Francisco, CA (US)

( * ) Notice: Subject to any disclaimer, the term of this patent is extended or adjusted under 35 U.S.C. 154(b) by 0 days.

(21) Appl. No.: 09/330,681

(22) Filed: Jun. 11, 1999

(51) Int. Cl.[7] .............................................. G06T 17/00
(52) U.S. Cl. ...................................................... 345/473
(58) Field of Search ................................ 345/473, 474, 345/475, 418

(56) References Cited

U.S. PATENT DOCUMENTS 5,880,731 A * 3/1999 Liles et al. .................. 345/349
5,936,633 A   8/1999 Aono et al. ................. 345/432

FOREIGN PATENT DOCUMENTS

| EP | 0899924 | 3/1999 |
| JP | 1079045 | 3/1998 |
| JP | 11-102450 | 4/1999 |

* cited by examiner

Primary Examiner—Cliff N. Vo
(74) Attorney, Agent, or Firm—Gray Cary Ware & Freidenrich LLP

(57) ABSTRACT

A system and method for three dimensional character animation provides a rapid download of the animated character since the persistent data of the animated character may be downloaded initially to begin the animation. One or more behavior files may then be downloaded as needed which reduces the initial download time of a character. The system may store the persistent data in a character cache. To reduce the size of the behavior files, the persistent data may include morphlinks, for each polygon on the character, that determine the contributions that the movement of each joint in the character make on each polygon of the character.

98 Claims, 18 Drawing Sheets

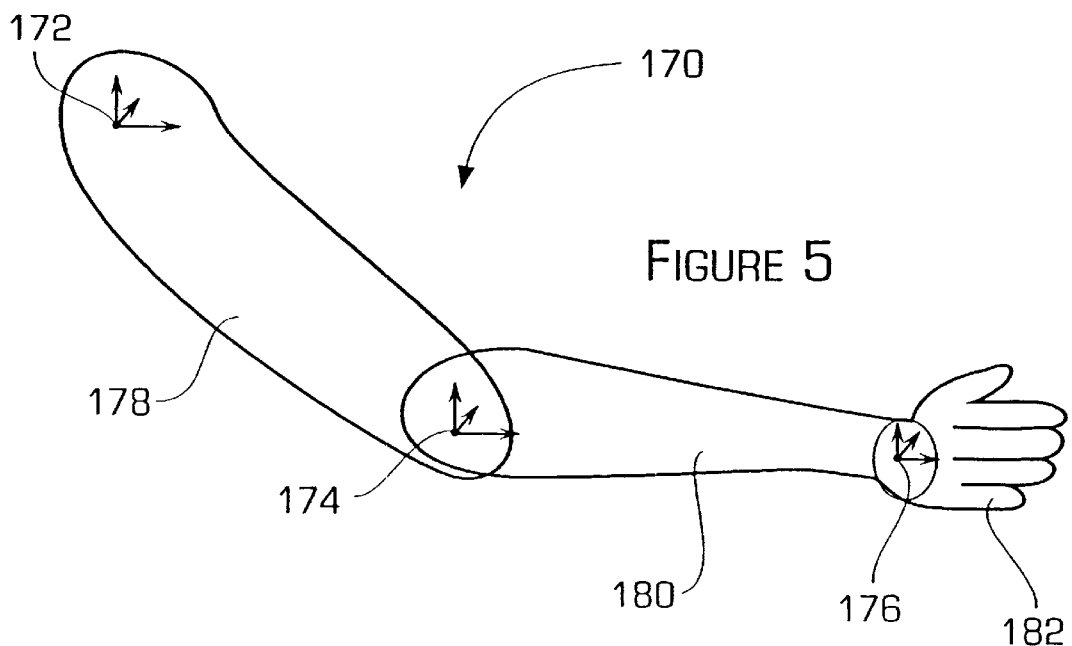
FIGURE 5
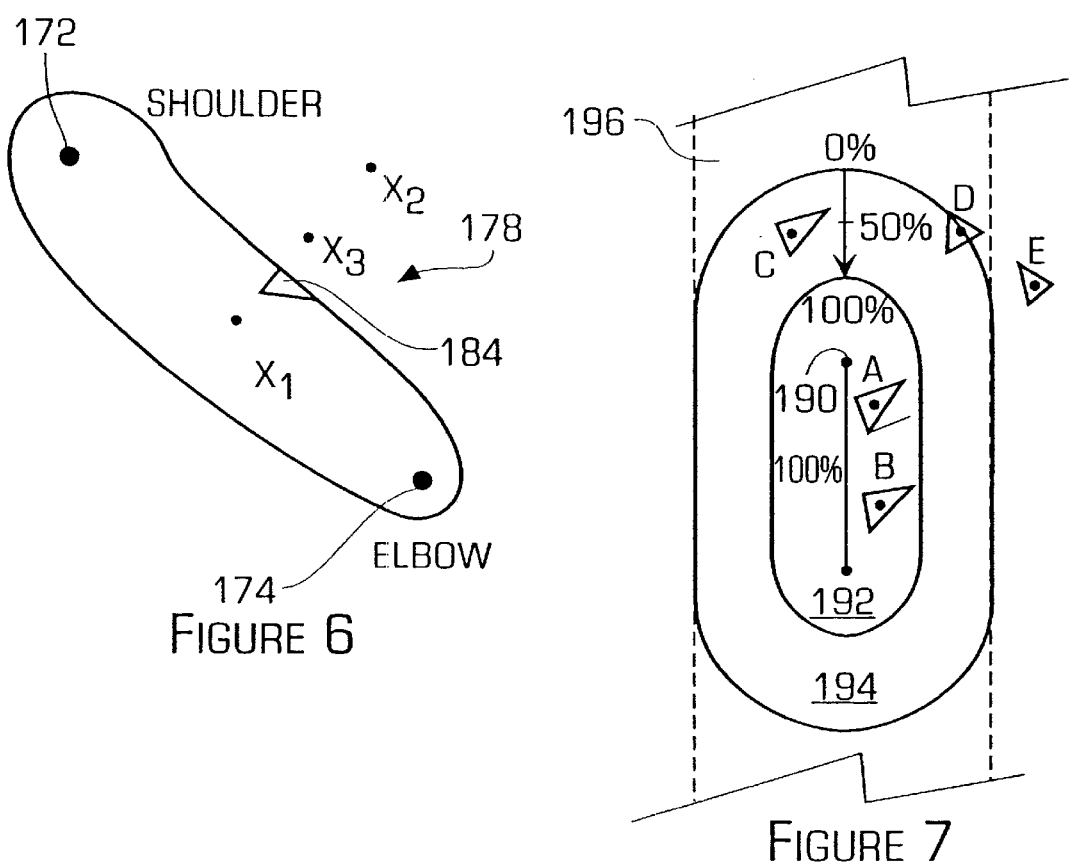
FIGURE 6
FIGURE 7

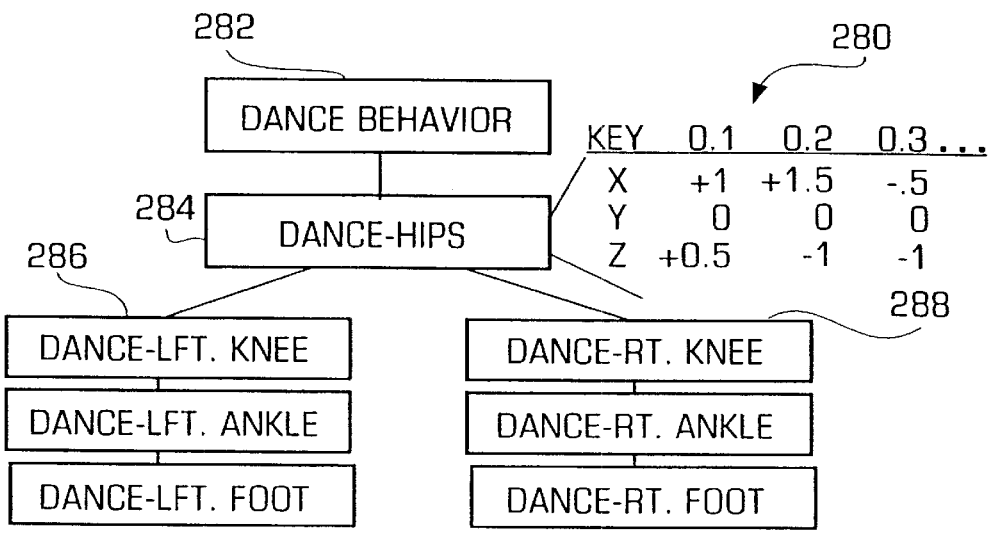
FIGURE 18
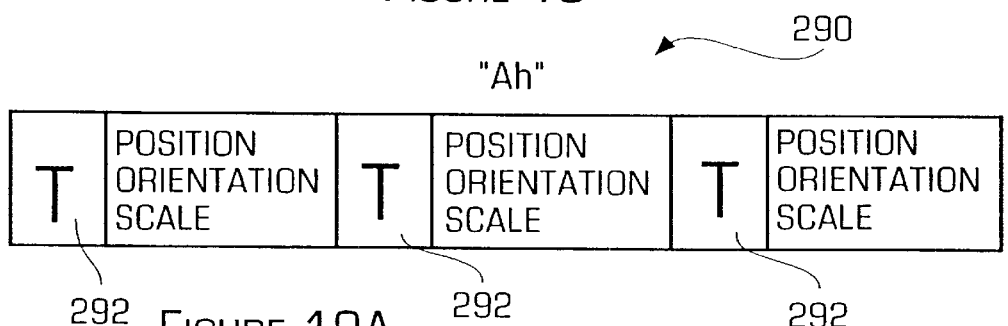
FIGURE 19A
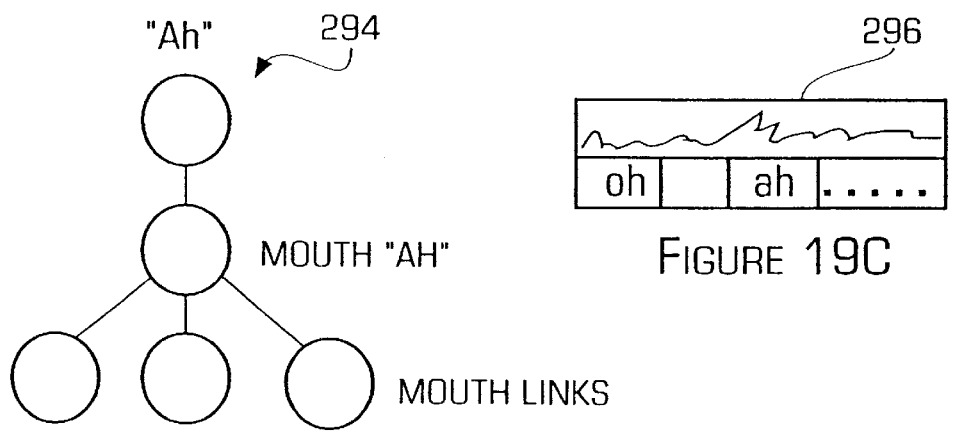
FIGURE 19B
FIGURE 19C

THREE DIMENSIONAL ANIMATION SYSTEM AND METHOD

BACKGROUND OF THE INVENTION

This invention relates generally to a system and method for animating a computer image on a computer display and in particular to a system and method for generating realistic three-dimensional animation of an object over a low bandwidth communications network.

There are many different techniques for generating an animation of a three dimensional object on a computer display. Originally, the animated figures looked very much like stick figures or block figures since the animation was not very good. In particular, the user would see a block representing the arm move relative to a block representing the forearm. The problem was that there was no skin covering the blocks so that the figure looked unrealistic and not very life-like. More recently, the figures for animation have improved so that a skin may cover the bones of the figure to provide a more realistic animated figure.

Some techniques and systems, such as those used to generate three dimensional animation for a movie, are very high-end and expensive. In addition, these high-end three dimensional animations may be viewed by a consumer on a movie screen, for example, but cannot be interacted with in any way. In particular, the consumer may view the three dimensional animations which tell a story such as in a movie but the consumer cannot interact with the animations in any manner. These high-end animation systems are very useful for a movie, but cannot be readily used by the general public due to the costs of the system.

Other animation systems, such as dedicated game playing systems or personal computers executing a software application, permit the user to interact with the animations. These systems, however, require a large amount of memory for storing the animation data and a fairly state-of-the-art processor or graphics coprocessor in order to produce realistic three dimensional animation. The problem with a dedicated game playing system is that it cannot be used for other computing related tasks and therefore are relatively expensive due to the limited functions that they perform. The problem with most personal computers is that the personal computer is not optimized to produce the animations and therefore usually requires an expensive graphics co-processor and a sound board. In the above conventional animation systems, the user may interact with the animation during the game play, but the entire game with the graphics and animation are stored on a cartridge or on a hard disk or CD of the personal computer.

Recently, a number of animation systems have been introduced which harness the Internet or the World Wide Web (the Web) to communicate the animation data to the user. In particular, the user may use a personal computer which is executing a browser software application. The user may direct the browser application to a particular uniform resource locator (URL) of a web site which then may download the animation data from the web site. The problem is that the web site typically downloads the entire animation data so that the amount of animation data downloaded is large. An example of this type of animation system uses the virtual reality markup language (VRML) protocol. For a user with a slow communications link, such as the Internet or the Web and a modem, the large amount of animation data leads to a very slow download. The slow downloading time in turn leads to the consumer waiting a long period of time before viewing the animation. This long period of waiting before the animation is not acceptable since people become bored during the waiting period, cancel the animation and thus never see the animation displayed. It is desirable, however, to provide a three dimensional animation system in which the animation data which may be downloaded rapidly over a very slow communications link and it is to this end that the present invention is directed.

SUMMARY OF THE INVENTION

The invention provides a three dimensional animation system and method in which the animation data may be downloaded over a relatively slow communications link, such as the Internet or Web and a modem, to a local computer in a relatively short amount of time. The local computer may then execute a downloaded software application to animate the object. The user of the local computer may interact with the animated object (i.e., change its behaviors or actions). In a preferred embodiment, the main portion of the system may reside as a plurality of software applications on a web server and a client computer may access the web server to download the animations. To accomplish the shorter download time, the system may generate an initial animation download package containing the data about the actual object (e.g., the persistent data) and a few basic actions of the object (e.g., behavior data). For example, each downloaded object may have an idle behavior associated with it which is executed any time that the object is not executed another behavior. Then, as additional actions or behaviors or sound tracks for the object are required, the system may stream the behavior data down to the client computer before the action is required so that the behaviors are asynchronously downloaded (i.e., the behaviors for the three dimensional animated object do not need to be downloaded at the same time as the three dimensional animated object is downloaded). In this manner, the client computer may more quickly begin the animation while other yet unneeded actions or behaviors are being downloaded. For example, as the animated object moves through a landscape, the object may cross a bounding box, which causes an action that will be needed shortly to be downloaded to the client computer so that the action is available when needed. The one or more behavior or action files for a particular object may contain information about the movements of the joints in the object, which correspond to a particular behavior and any other data necessary to execute the behavior. For example, a head nod behavior may involve the movement of the neck joint. As another example, a sound track for the object, such as saying "Hello", may involve the movement of the various pieces of the lips and a sound track synchronized to the movement of the lips.

In accordance with the invention, the total size of each behavior downloaded to the client computer is also relatively small in size so that the download time of the behavior, over a relatively slow communications link, is not too slow. To reduce the size of each behavior, the initial object downloaded to the client computer may include an object tree containing data about each portion of the object. For example, a person would include a leg object. Then, each piece of skin on the object (e.g., each polygon) may include a contribution chart which lists each joint in the object, such as the knee or ankle, and the contributions that the movement of each joint makes to movement of the particular polygon. For example, a polygon near the knee joint would probably be mostly influenced by knee movement while a polygon midway between the knee and ankle would be influenced by the movement of both the ankle and the knee. Thus, when a behavior commands the knee of the object to move, the client computer may easily determine the movement for each particular polygon based on the model of the object and the movement of the joints. Thus, for any downloaded behavior, only the movements of the joints in the object need to be specified in the downloaded behavior file since the movement of each piece of skin on the model may be determined by the model based on the movement of the joints. Thus, if the model has twelve joints and 6000 polygons, the downloaded behavior file may contain data about the movement of the twelve joints whereas the behavior may cause the 6000 polygons on the model to move.

In accordance with the invention, the system also permits a downloaded behavior to be streamed to the player application residing on the user's computer. In particular, the behavior may start playing on the player application before the entire behavior is downloaded. For example, if a behavior is five minutes long, the user of the player application is not likely to wait 5 minutes for the behavior to be downloaded. Therefore, in accordance with the invention the system downloads a predetermined amount of the behavior (e.g., a two second portion of the behavior data) at a time so that the behavior may start executing the first predetermined portion of the behavior data while the second and subsequent portions of the behavior data are downloaded. Thus, a long behavior being downloaded to the player application does not prevent the animated character's behavior from being started.

The system may also permit the user to interact with the animated objects in various different ways using actions and scripts which include one or more actions or behaviors. For each interaction with the object, there may be an action or behavior associated with that interaction. For example, when the user clicks on an animated door being displayed to the user, a behavior to open the door and show the door slowly opening with a creaking soundtrack may be downloaded to the client computer and executed. On the client computer, the user may see the door slowly open and hear the door creak as it opens. As another example, when the user drags a cursor over an object, such as a gray knife, a behavior to turn the knife red will be downloaded and executed so that the knife turns red when the user places the cursor over it. When the user moves the cursor off of the knife, the knife returns to its idle behavior which is having a gray color.

To shade the animated object using a lighting model, the invention may use a spherical environmental map. In particular, the pixels resulting from a particular lighting condition is determined for a half-sphere and then the corresponding lighting for an object is determined based on the pixels in the half-sphere. The lighting model for the half-sphere may be downloaded to the client computer so that, for each pixel of the object, the client computer may look up the corresponding point on the half-sphere and apply the pixel value on that portion of the half-sphere to the object. Thus, in accordance with the invention, the system does not attempt to calculate, in real-time, the lighting for an object. The system may also provide a character cache in the client computer that permits the character data to be stored in the client computer so that it does not need to be constantly refreshed. In contrast, in a conventional Web based 3-D system, such as VRML, the character may be stored in the cache of the browser application which is periodically flushed.

Thus, in accordance with the invention, a system for animating a character on a computer is provided, comprising a first computer and a second computer connected to the first computer. The first computer may store one or more pieces of data associated with a particular animated character. The pieces of data may include a persistent data file containing one or more of a geometric model of the animated character, a texture associated with the animated character and a sound associated with the animated character. The pieces of data may further comprise one or more behavior files wherein each behavior file contains data about a particular behavior of the animated character and each behavior specifies the movement of the model. The second computer may initially download the persistent data file from the first computer in order to begin the animation of the animated character on the second computer and then asynchronously download a behavior file from the first computer just prior to the execution of the behavior of the animated character by the second computer.

BRIEF DESCRIPTION OF THE DRAWINGS

FIG. 5 is a diagram illustrating an articulation of a joint;

FIG. 6 is a diagram illustrating a morphlink in accordance with the invention;

FIG. 7 is a diagram illustrating an example of the area of influence of a joint in accordance with the invention;

FIG. 18 is a diagram illustrating an example of a behavior in accordance with the invention;

FIG. 19A, 19B and 19C are diagrams illustrating another example of a behavior in accordance with the invention;

DETAILED DESCRIPTION OF A PREFERRED EMBODIMENT

The invention is particularly applicable to a Web-based three dimensional animation system and method and it is in this context that the invention will be described. It will be appreciated, however, that the system and method in accordance with the invention has greater utility, such as to other types of three dimensional animation systems including stand-alone computer systems and the like.

Figure 1:
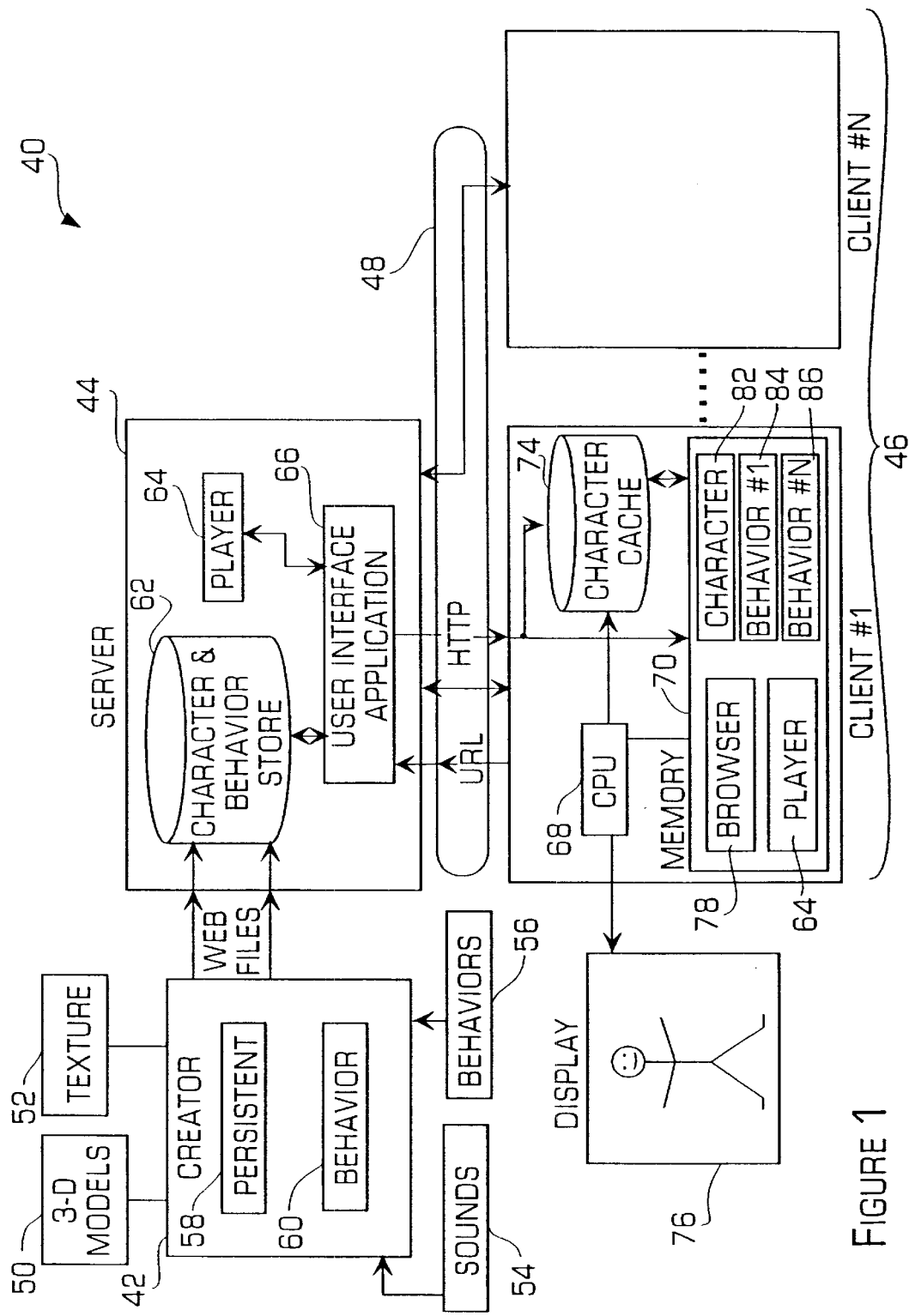
FIG. 1 is a block diagram illustrating the three dimensional animation system in accordance with the invention.

FIG. 1 is a block diagram illustrating a three dimensional animation system 40 in accordance with the invention. The system 40 may include a character creator 42, a server 44 and one or more client computers (CLIENT #1–CLIENT #N) 46. In this example, the client computer may be connected to the server by a communications network 48 that may include various communication or computer networks such as the Internet, the World Wide Web (the Web), a local area network, a wide area network or other similar communications networks which connect computer systems together. The creator 42 may be used to generate a three dimensional animated character as described below. In a preferred embodiment, the creator 42 may be a software application being executed by a computer system. The creator 42 may be stored on the server 44 or may be executed by a separate computer system as shown in FIG. 1. The creator 42 may generate one or more web files, as described below, which may be downloaded to the server 44 so that each client computer may then download the web files from the server. Each client computer may then interpret the downloaded web files and generate a three dimensional animation based on the web files as described in more detail below. Now, each portion of the system 40 will be described in more detail.

The creator 42 may accept various information from either user input or other external files in order to generate a three dimensional realistic object or character, which may be animated using the system. For example, the creator may receive three dimensional models 50 which may be, for example, wire frame models of an object generated by a third party modeling system. The generation of a three-dimensional wire frame model from a three dimensional object is well known and therefore will not be described here. The creator 42 may also receive texture map information 52 which may be used to place a texture over the polygons painted onto the three dimensional object. The texture may provide, for example, a realistic flesh color and texture for the skin of a human character or a realistic set of teeth. The creator 42 may also receive a sound file 54 so that a sound track may be incorporated into a behavior file in accordance with the invention. The sound file may be generated by a third party system, which receives a sound and generates a digital representation of the sound, which may be incorporated into a file. The creator may also receive a behavior file 56. The behavior file may be combined with any sound file to generate a behavior for a three dimensional animation in accordance with the invention. The behavior file may be generated by the user using a separate software module of the creator 42. The creator 42 may combine the three-dimensional model information, the texture information, the sound file and the behavior file into one or more web files, which are stored on the server.

In accordance with the invention, the creator 42 may generate more than one file for each animated object. In particular, the creator may generate a file containing persistent data 58 and then one or more files containing behavior data 60. The persistent data file may be initially downloaded to the client computer to begin the animation of the object and may include one or more of the three dimensional object (including joints and polygons), any textures, any morphlinks as described below, and an idle behavior for the three dimensional object. The idle behavior may be the action or movement of the animated object when no other behavior is being executed. For example, the idle behavior for an animated monster may be that the monster may breath which causes his chest to expand and contract.

The persistent data file may also include the morphlink data associated with each polygon in the model in accordance with the invention. The model may include one or more joints connected together by one or more bones and a skin of polygons which cover the bones and joints. For each polygon on the model, the morphlink data permits the client computer to easily determine the movement of the polygons based on the movement of the joints of the object. In a conventional animation system, the movement of each polygon must be independently calculated which is very slow. When a model is generated, the user of the creator defines the morphlinks so that the movement of a particular polygon based on the movement of the joints is determined by the user. Thus, the movement of each polygon relative to movement of the joints of the model is defined in the persistent data. Therefore, when a behavior of the three dimensional animation is executed, the behavior may contain only information about the movement of each joint in the model and the client computer, based on the morphlinks, may determine the movement of each polygon on the model. Thus, the size of the behavior file downloaded to each client computer in accordance with the invention is reduced which speeds up the download speed of each behavior. In addition, the speed with which the three dimensional animation may be animated is increased since the client computer does not need to calculate the movement of each polygon on the three dimensional object or character each time a behavior occurs. The persistent data file 58 may also be compressed to further reduce the size of the persistent data. As an example, due to the compression and the structure of the persistent storage file in accordance with the invention, a persistent storage file may be approximately 10–200 Kb depending on the complexity of the three dimensional animation whereas a typical animation file may be approximately 1 Mb.

The one or more behavior files 60 may each contain a data structure which contains data specifying the movement of each joint in the three dimensional object or character during a behavior and any sound file which is associated with the particular behavior. In accordance with the invention, each different behavior of the three dimensional animation, such as smiling, talking about a particular subject, sitting, etc., may be contained in a separate behavior file. In accordance with the invention, each behavior file may be downloaded to the client computer only when the behavior is required. For example, a behavior to pick up an object from the ground for a game player may only be downloaded when the game player nears an object which may be picked up. As another example, a behavior to say "Good-bye" is only downloaded to the client computer when the user clicks on a good-bye button on the user interface. Thus, the system may download the behavior files asynchronously with the persistent data file. Due to the morphlinks in the persistent data, the size of the behavior files, as described above, is very small. It should be realized, however, that each behavior file is associated only with a particular persistent data file (since the structure of the behavior and the persistent storage are tied together) and therefore a walking behavior for two separate models will be slightly different. The behavior files may be generated by the creator 42 in response to user input. The behavior files may be compressed in that the data for any joints which do not move during a predetermined time during the behavior is not downloaded to the client computer.

Once the behavior and persistent data files are generated, they may be downloaded to the server 44 and stored in a character and behavior storage device 62 which may be a persistent storage device such as a hard disk drive, a tape drive or the like. The server 44 may also include a player store 64, which contains a player web file. The player web file is the software application, which is first downloaded to the client computer so that the client computer may then interpret the persistent data file as well as the behavior files. Thus, the server 44 may first download the player software application to the client computer (if necessary) and then, based on user input into a Web user interface application 66, download the persistent data file so that the animation may begin. Then, as behaviors of the three dimensional animation are needed by the client computer, the server may download the appropriate behavior file to be executed by the player on the client computer.

Each client computer 46 may include a CPU 68, a memory 70 containing one or more software application to be executed by the CPU 68, a character cache 74 which may reside on a persistent storage device of the client computer and a display 76. The character cache 74 may store the persistent data 58 when it is downloaded to the client computer the first time so that it may not be necessary to downloaded the persistent data again when the particular client computer again wants to view the same animation. Unlike conventional animation systems in which the character data is stored in the cache of the browser application so that the character data is periodically flushed, the system has its own character cache.

The memory 70 may store a browser application 78 which permits the client computer to interact with the server 44 by specifying a uniform resource locator (URL) of the server in order to receive the web files stored on the server using a hypertext transfer protocol (HTTP). The memory may also store the player software application 64 to interpret the persistent data file and the behavior files and generate the animated object, a character file 82 generated from the persistent data file, a first behavior file 84 containing the idle behavior and a second behavior file 86 that may contain a behavior that will be executed soon. Thus, the character file and the current behavior files are both stored in the memory 70 while being executed by the player. As new behaviors are needed, those behaviors are downloaded to the client computer and one of the old behaviors may be deleted to make room from the new behavior. The number of behaviors stored in the client computer at any time depends on the amount of memory space available for the animation system. The animation generated by the player 64 based on the persistent data and the behavior files may be displayed on the display 76. Now, a method for downloading three dimensional character files in accordance with the invention will be described.

Figure 2:
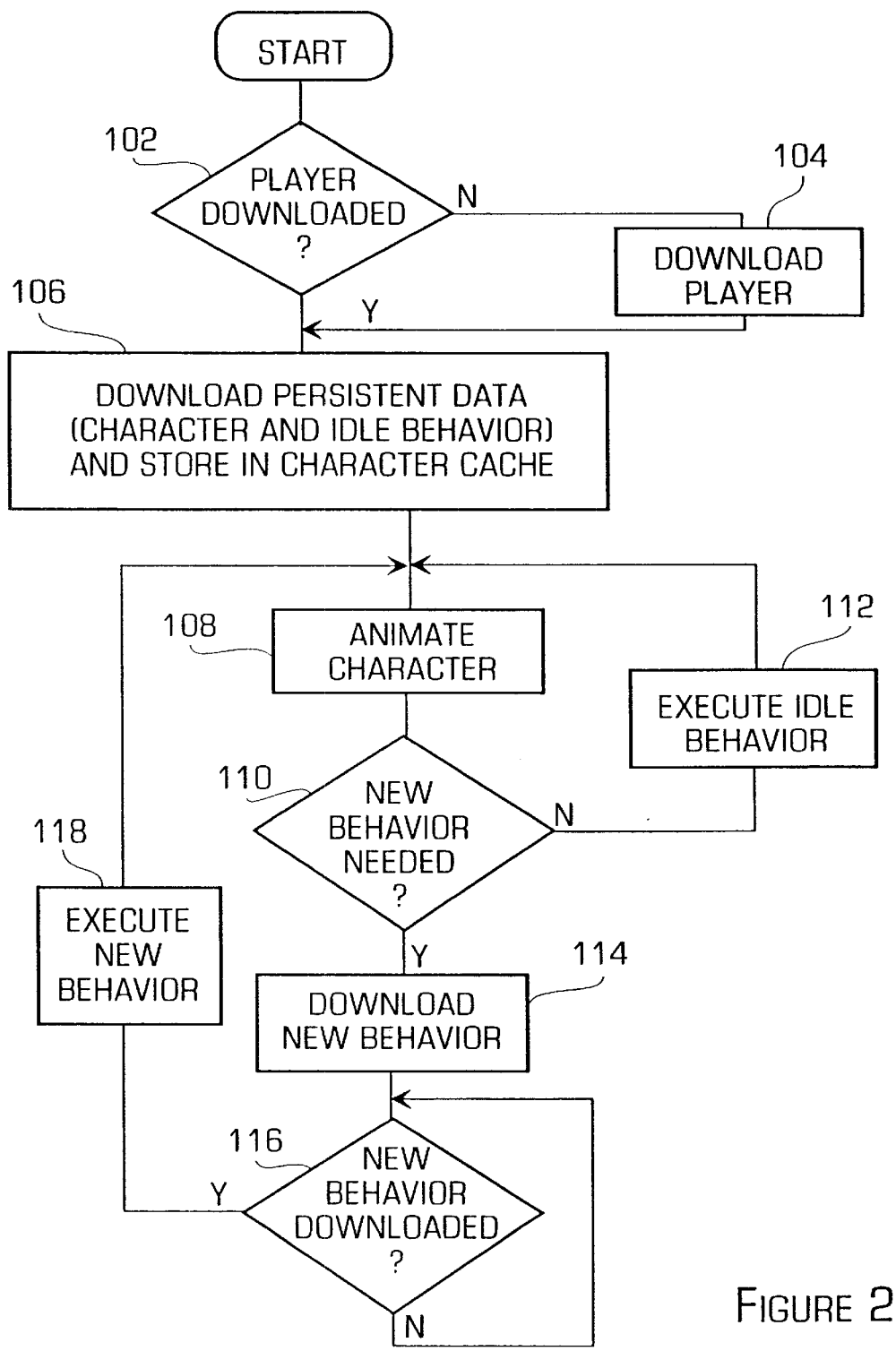
FIG. 2 is a flowchart illustrating a method for downloading three dimensional character files in accordance with the invention.

FIG. 2 is a flowchart illustrating a method 100 for downloading three dimensional character files to a particular client computer in accordance with the invention. The downloading method permits the animation to begin rapidly since the downloading time is reduced due to the asynchronous download of the behavior files and the persistent data file. In step 102, the server may determine if the player application has previously been downloaded to the client computer and may downloads the player software in step 104 if it has not already been downloaded. Once the player is downloaded to the client computer, the server may download the persistent data file (that may include the character file and an idle behavior file) to the client computer in step 106. The client computer may then create a character cache if one does not exist and store the character file and the idle behavior file in the character cache. Next, the player application is executed by the client computer and the player application may use the persistent data to animate the character and execute the idle behavior in step 108. In accordance with the invention, all of the behaviors for an animated object do not need to be initially downloaded so that the download time for the persistent data is reduced and the animation may begin more quickly. Next, the player application may determine if a new behavior for the animated object is needed in step 110 and continue to execute the idle behavior in step 112 if no new behavior is needed. If a new behavior is needed, then the server may download the new behavior in step 114 in response to a request by the player application. The player application may then determine if the new behavior has finished downloading in step 116 and continue to execute the prior behavior until the new behavior is downloaded. If the new behavior is downloaded, then the player may execute the new behavior in step 118 and return to step 108. In accordance with the invention, the behaviors are downloaded to the client computer as they are needed so that the start time of the animation is reduced. In addition, since the size of the behavior files is small due to the morphlinks, the total download time for any behavior file is also short. Now, an example of the object hierarchy in the three dimensional animation system will be described.

Figure 3:
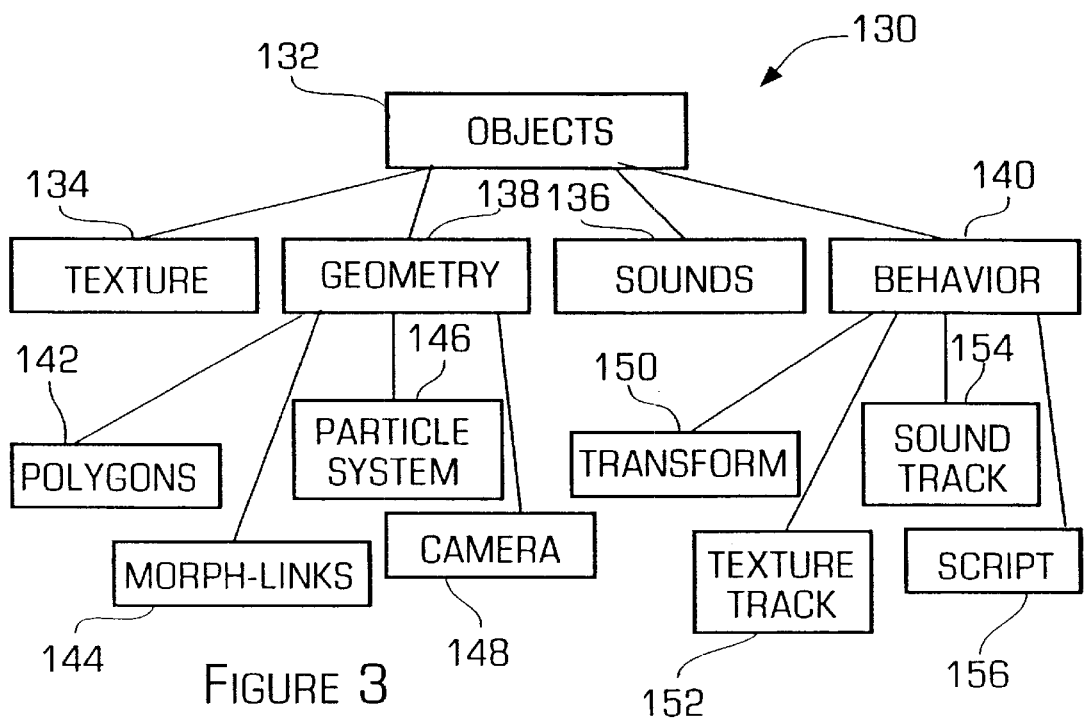
FIG. 3 is a diagram illustrating an example of an object hierarchy in accordance with the invention.

FIG. 3 is a diagram illustrating an example of an object hierarchy 130 in accordance with the invention. As shown, the object hierarchy may include a tree of objects organized underneath a root node 132. The objects used in the three dimensional animation system may include a texture object 134, a sound object 136, a geometry object 138 and a behavior object 140. Each of these objects may then include sub-objects as shown for the geometry and behavior objects. In particular, the geometry object 138 may include a polygon object 142 containing the polygons associated with a particular model, a morphlinks object 144 containing the morphlinks associated with each polygon in the model, a particle system object 146 for storing smaller objects such as rocket ship exhaust and a camera object 148 for storing information about the camera position and angle with respect to the model. The geometry may further include additional information about the model as shown in FIG. 4B.

The behavior object 140 may include a transform object 150 containing movement information for the joints of an object to transform the object, a texture track object 152 containing an animated texture of a model, a sound object 154 containing a sound track associated with a behavior and a script object 156 containing a sequence of behaviors combined together to form a new behavior. For example, a script may be for interacting with the animated character and may include a behavior for each response that the character makes to the user in response to user input. Each animated object may include one or more of the above objects. Now, an example of the object for a particular character/model will be described.

Figure 4A:
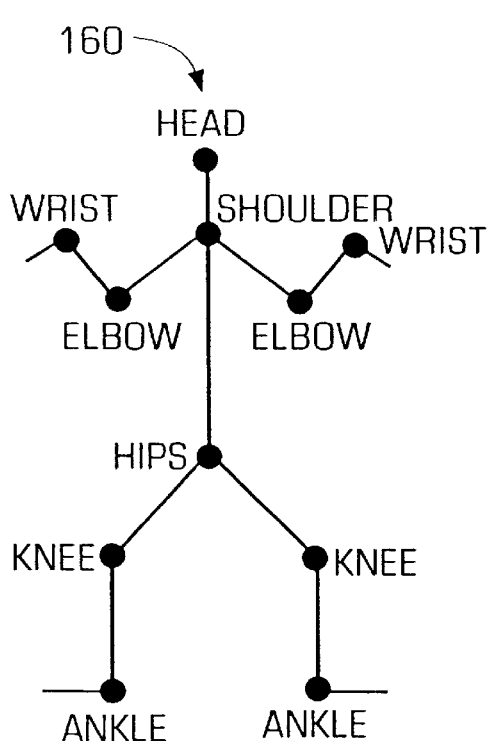
FIGS. 4A and 4B are diagrams illustrating an example of a three dimensional object in accordance with the invention.
Figure 4B:
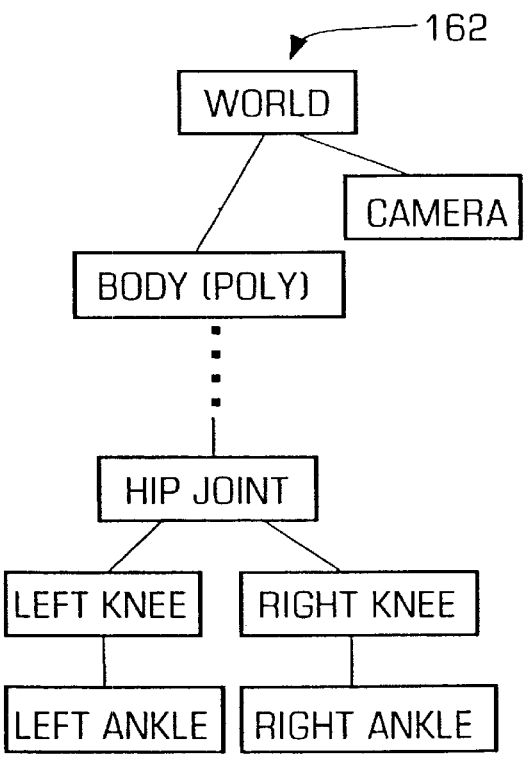

FIGS. 4A and 4B are diagrams illustrating an example of a character object and a three dimensional object associated with that object in accordance with the invention. FIG. 4A is a diagram illustrating a geometry object 160 for a human character in which the object models the joints of the character. For example, the object shown includes a head, a neck, two elbows, two wrists, hips, two knees and two ankle joints. As described above, the movement of a character is specified by the movement of the joints of the character which may then be turned into movement of the polygons on the model based on the morphlinks. A three dimensional object tree 162, as shown in FIG. 4B, which models this human character has a similar structure. In particular, the object tree 162 may include a WORLD node connected to a CAMERA node and a BODY node. The BODY node may further include various objects modeling the various joints in the body. As shown, the BODY node may include a HIP JOINT node, a LFT KNEE object and a RT KNEE object connected to the HIP JOINT node and a LFT ANKLE and RT ANKLE node connected to the appropriate knee nodes. Each object in the object tree that is connected to an object above it in the tree inherits the attributes of the object above it. For example, any movement of the LFT KNEE object may cause the LFT ANKLE object to inherit the same movement. This inheritance of the knee movement by the ankle provides a good model of the human body. Similarly, if the HIP JOINT object moves, both of knee objects and both of the ankle objects inherit the movement of the HIP JOINT object. Therefore, once the movement of the HIP JOINT object is specified in a behavior, the movements of the knees and ankles caused by the HIP JOINT movement do not need to be specified. Now, the articulation of a joint in accordance with the invention will be described.

FIG. 5 is a diagram illustrating an example of the articulation of joints of a character. In particular, an arm 170 of a three dimensional character is shown for illustration purposes. The arm may include a shoulder joint 172, an elbow joint 174, a wrist joint 176, an upper arm 178, a lower arm 180 and a hand 182. Similar to a human arm, each joint has six degrees of freedom since each joint may move in a positive or negative X direction, a positive or negative Y direction and/or in a positive or negative Z direction. For each predetermined period of time referred to as a key period, each joint may move in each of the six directions. The key period may preferably be 1/10th of a second and the player may interpolate the movement of the joint in each direction in between the key period to ensure that the motion of the joint is smooth. The key period may be set by the user. As each joint moves, the part of the body near that joint may also move. In a three dimensional animation character in accordance with the invention, the synchronization of the movement of the body part and the polygons which make up the "skin" of the body part with the joints of the character are accomplished by the morphlinks in accordance with the invention that will now be described in more detail.

FIG. 6 is a diagram illustrating a morphlink in accordance with the invention for the upper arm 178 shown in FIG. 5. In this example, the polygons covering the upper arm may be influenced by both the shoulder joint 172 and the elbow joint 174. For this example, the movement of a polygon 184 on the outside of the upper arm based on the movement of the shoulder joint and the elbow joint will be described. If the movement of the polygon 184 is influenced only by the shoulder joint's movement, the polygon 184 may move to position $x_1$. If the movement of the polygon 184 is influenced only by the movement of the elbow joint, the polygon may move to position $x_2$. To realistically model the movement of the polygon, however, neither of the above positions is accurate and would be perceived by the user viewing the animated character as an aberration. Therefore, the polygon 184 should be influenced by both the shoulder joint and the elbow joint so that the polygon 184 moves to position $x_3$ when the influence of both joints are used. In accordance with the invention, the relationship of each polygon on the character to the joints in the character may be stored in the morphlink data which is stored with the persistent data file. The morphlink data permits a behavior file to only specify the movement of the joints in the character (a small amount of data) and then the player application on the client computer may determine the movement of each polygon of the character based on the morphlink data. The actual influence areas of each joint on particular polygons on the three dimensional object is controlled by the user during the creation of the three dimensional character so that once the character is created, each polygon on the character has a fixed movement relationship with respect to the joints of the character. Now, an example of the area of influence of a joint will be provided.

FIG. 7 is a diagram illustrating an example of the area of influence of a joint in accordance with the invention. In this example, a joint 190 may have an inner area of influence 192 and an outer area of influence 194. A body part 196 surrounding the joint 190 is shown by the dotted lines. For polygons on the body part within the inner area of influence 192, the joint 190 contributes 100% of its movement to the movement of those polygons. In this example, the movement of polygons A and B have 100% contribution from the joint 190 so that, for example, if joint 190 moves 1" in the positive X direction, then polygons A and B also move 1" in the positive X direction. Then, if another joint moves 1" in the Y direction and also contributes 100% to the movement of polygons A and B, polygons A and B also move 1" in the Y direction in addition to the movement in the X direction. For polygons in the outer area of influence 194, the amount of influence on the particular polygon decreases as the polygon is located farther away from the joint. Thus, at the periphery between the inner and outer areas of influence, the contribution is still 100% while the contribution for a polygon at the outside edge of the outer area of influence is 0%. Thus, for polygon C in this example, the joint contributes 50% to the movement of polygon C so that if the joint moves 1" in the positive X direction, polygon C moves ½" in the positive X direction. For polygons D and E in this example, the joint 190 contributes 0% movement so that the movement of the joint does not affect those polygons. Thus, for each polygon on a three dimensional animated character, the contributions for each joint in the model is set by the user using the creator user interface and then stored in the morphlinks by the system in accordance with the invention. Now, an example of the process for creating a three dimensional animated character in accordance with the invention using the creator will be described.

Figure 8A:
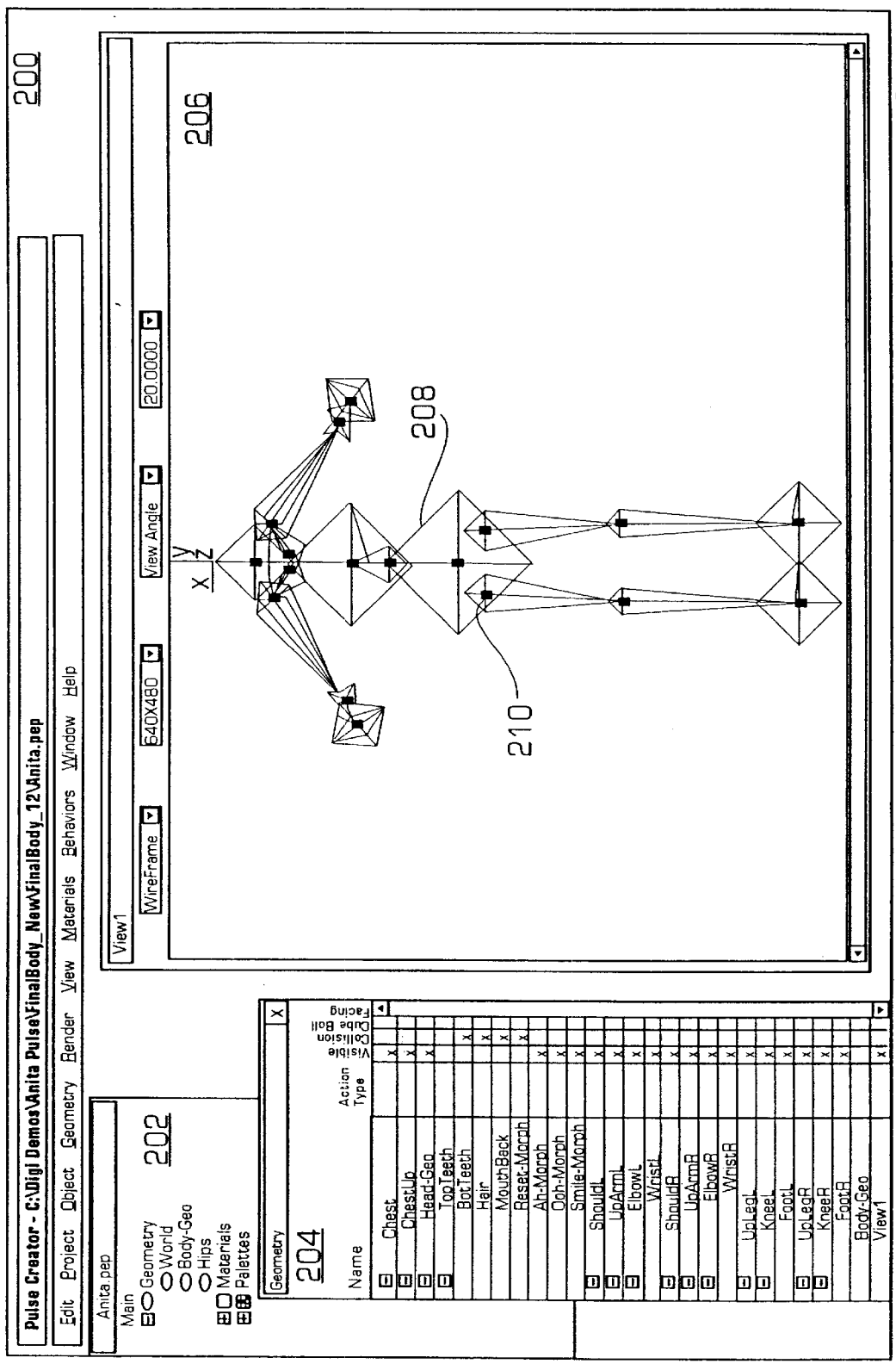
FIGS. 8A and 8B are diagrams illustrating an example of the bones within a model in accordance with the invention.
Figure 8B:
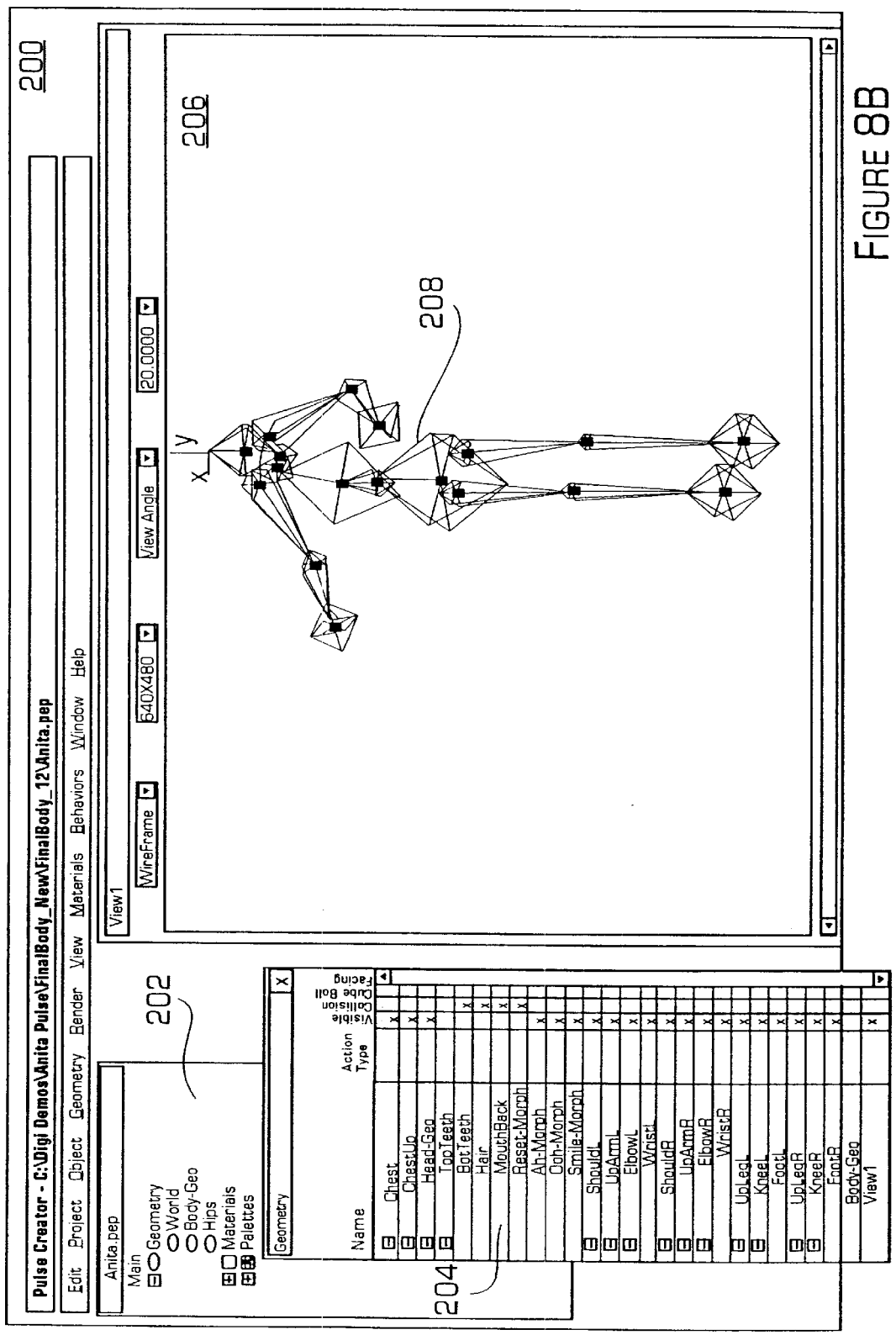

FIGS. 8A and 8B are diagrams illustrating an example of the bones within a model in accordance with the invention. The bones in the model are generated using a user interface 200 in the creator application. The user interface 200 may include an object window 202 which lists the objects, such as the geometry and materials (textures) associated with the particular three dimensional character being generated. The user interface 200 may also include a geometry window 204 which lists all of the geometry associated with the particular three dimensional character such as the neck, the left shoulder (ShouldL), the left upper leg (UpLegL) and the like. To help the person creating the character, the geometry is listed in object order so that the associations of objects with other objects and the attributions of the characteristics (such as the association of the upper left arm with the left shoulder) may be viewed by glancing at the geometry window. The geometry window also permits the user to make certain portions of the character invisible, if desired. The user interface 200 may also include a three dimensional character viewing window 206 which shows the user the current view of the character. In this example, only one or more bones of the character 208 and one or more joints 210 are shown by clicking the appropriate locations in the geometry window. The bones and joints of the three dimensional model may be generated by the creator application or by a well known third party piece of software. Once the bones of the character have been laid out and set by the user, the user may place a "skin" of polygons over the bones as will now be described with reference to FIG. 9.

Figure 9:
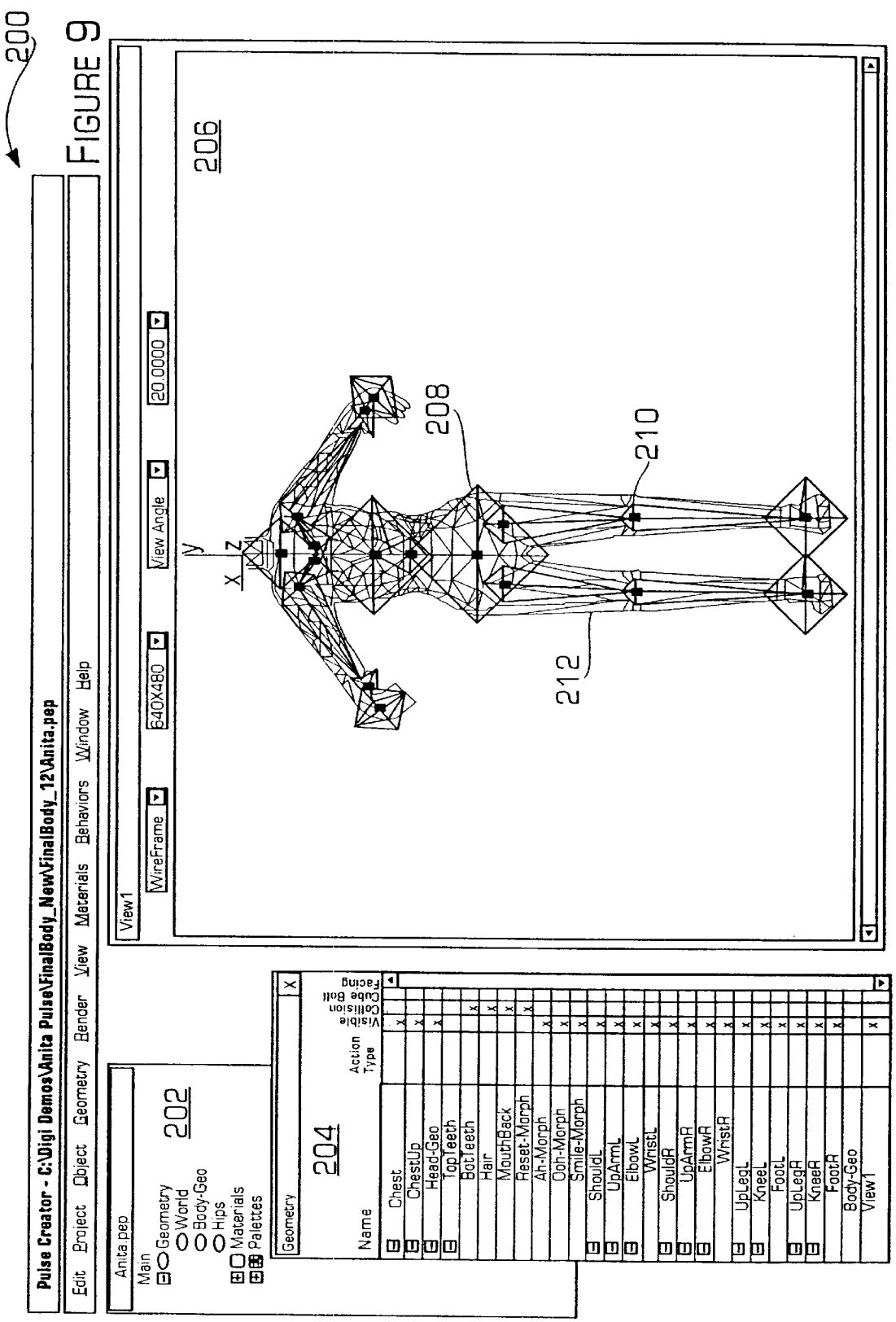
FIGS. 9 and 10 are diagrams illustrating an example of a model with the bones and polygons in accordance with the invention.
Figure 10:
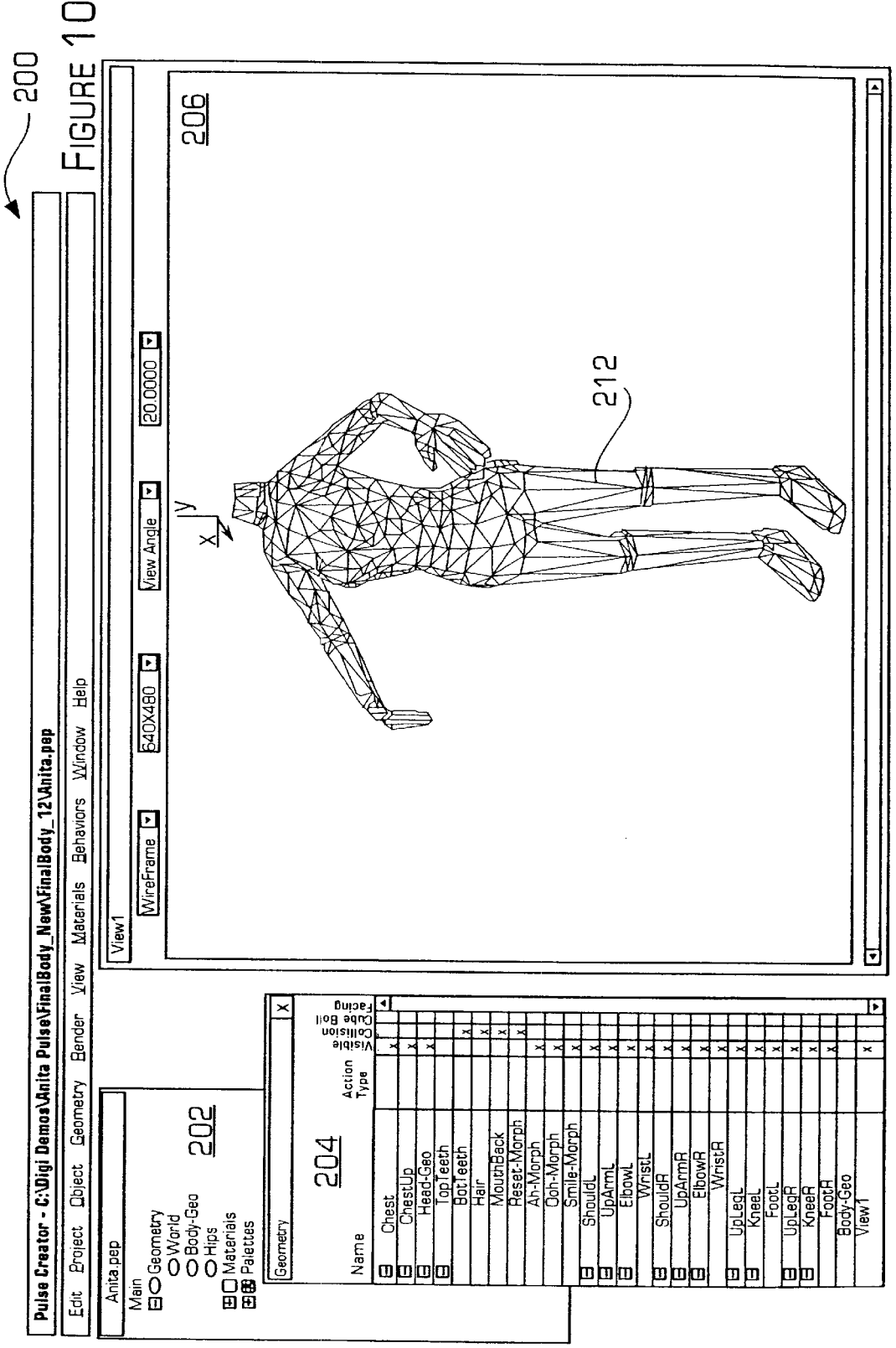

FIGS. 9 and 10 are diagrams illustrating an example of a model with the bones and polygons in accordance with the invention and an example of a character displayed with only the polygons, respectively. Once again, the user may create the three dimensional animated character using the user interface 200 of the creator. In this figure, the user has selected to have the bones 208 and joints 210 shown in window 206 with a polygon skin 212 placed over the bones and joints. The polygon skin may be generated by the creator application or by a third party piece of software. The polygon skin 212 forms the actual surface seen by a person when viewing the three dimensional animated character and any texture mapped onto these polygons. FIG. 10 shows the character with just the polygons 212 being displayed to the user in the user interface 200. The character shown in FIG. 10 accurately depicts what the three dimensional animated character may look like with the exception of a texture being placed on the polygons. A three dimensional animated character with a texture placed on the polygons will now be described with reference to FIGS. 11 and 12.

Figure 11:
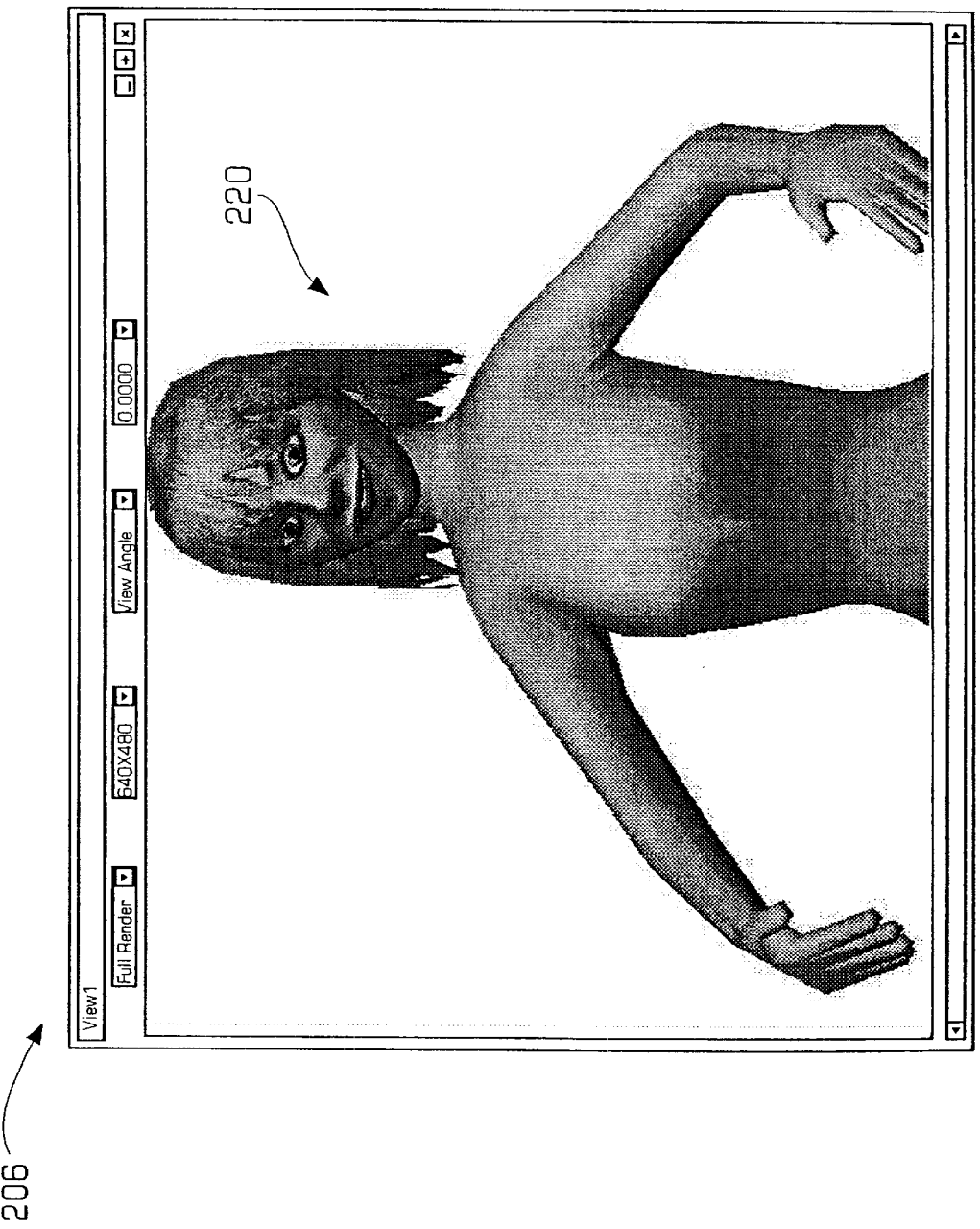
FIG. 11 is a diagram illustrating an example of a rendered, unlighted model in accordance with the invention.
Figure 12:
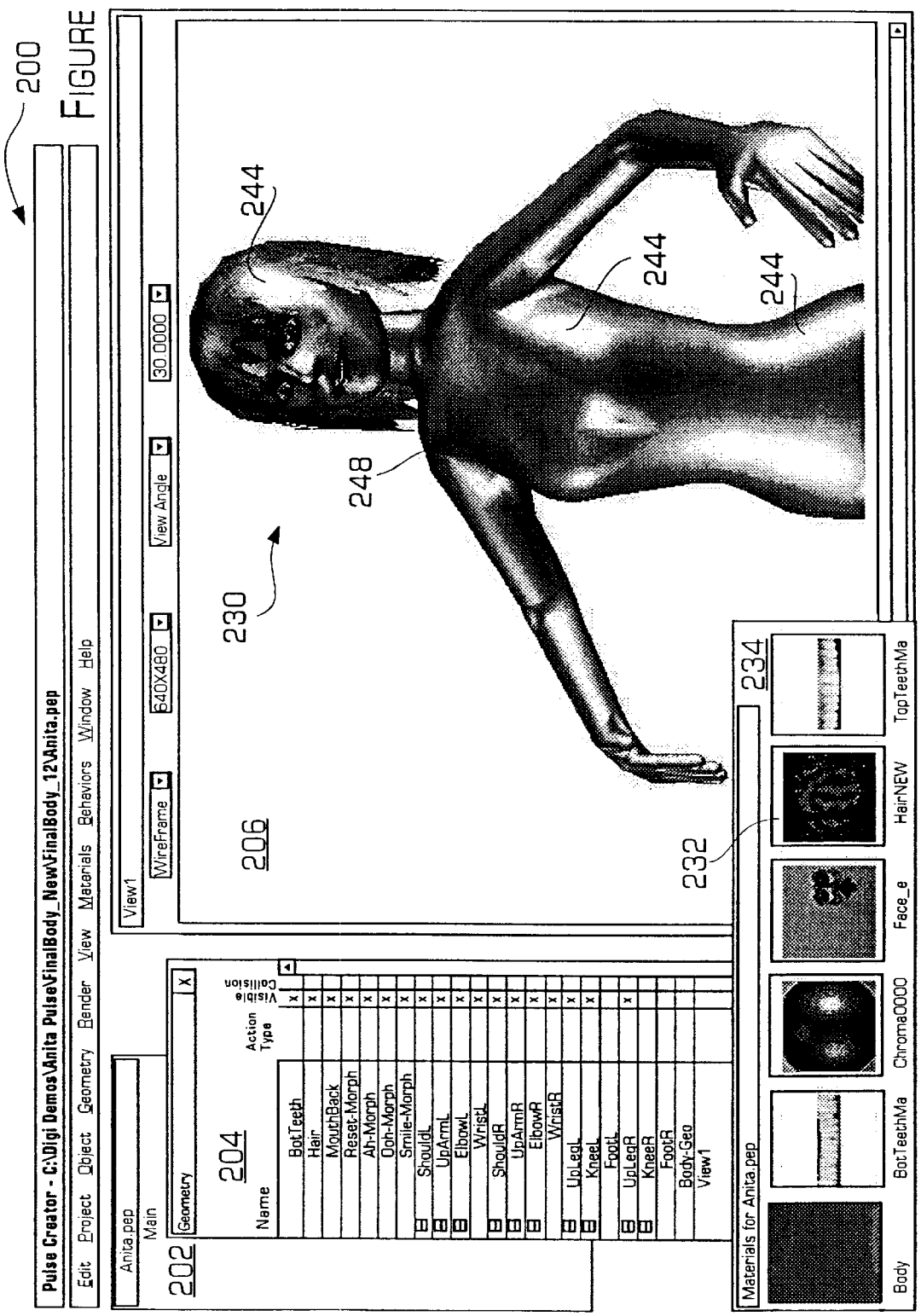
FIG. 12 is a diagram illustrating an example of a rendered, lighted model in accordance with the invention.
Figure 14:
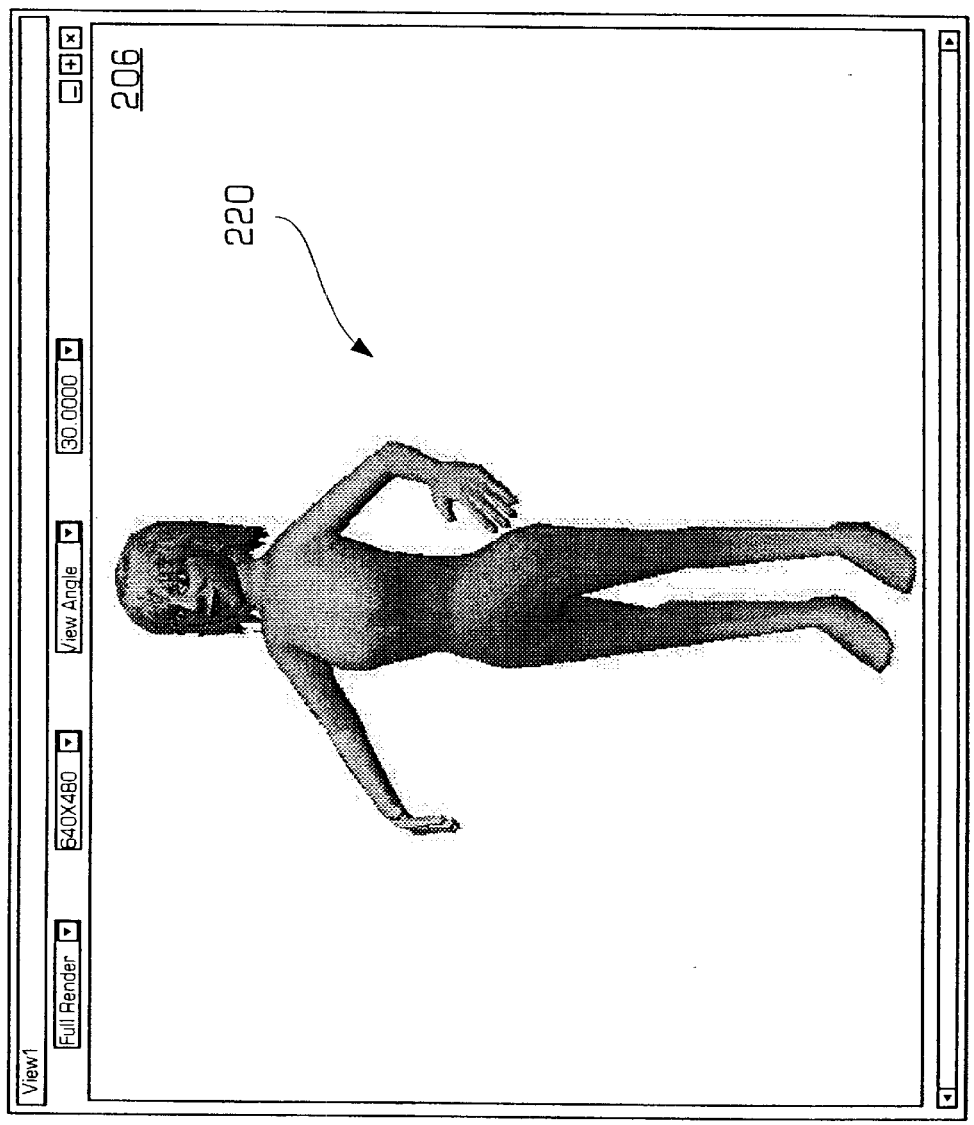
FIG. 14 is a diagram illustrating an example of the rendered model shown in FIGS. 11 and 12.

FIG. 11 is a diagram illustrating an example of a rendered, unlighted character 220 in accordance with the invention within the viewing window 206 while FIG. 12 is a diagram illustrating an example of a rendered, lighted character 230 in accordance with the invention. As shown in FIG. 11, the three dimensional character has been covered with textured polygons so that, for example, the character has long hair, eyebrows, a nose, a mouth with lips and eyes. The textures may be generated by a third party piece of software and then positioned onto the animated character by the user using the creator application. The entire unlighted character 220 is shown in FIG. 14.

In FIG. 12, the same character has a chrome texture and has been lighted with a particular lighting model. To texture the character with the chrome surface, a material window 232 may be displayed which permits the user to select a material/texture. In this example shown, the chrome material was selected. The material window may include a palette 234 of materials which may cover the polygons, such as a body material, a bottom teeth material, a chrome material, a hair material and a top teeth material. The lighting may be applied to the character by specifying a lighting model for the character. An example of a lighting model will now be described with reference to FIG. 13.

Figure 13:
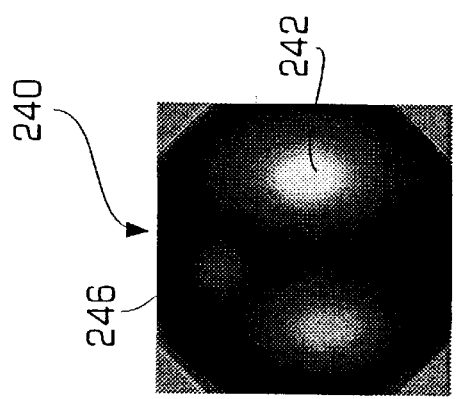
FIG. 13 is a diagram illustrating an example of an environmental map lighting model in accordance with the invention.

FIG. 13 is a diagram illustrating an example of an environmental map lighting model 240 in accordance with the invention which may be applied to a three dimensional character such as the one shown in FIG. 12. The environmental map 240 is generated by having the selected lighting choice illuminate a surface of a sphere. Thus, as shown in FIG. 13, the particular lighting model causes the sphere's surface to have a particular appearance made up of individual pixels having different intensities. To transfer the lighting model onto a three dimensional character, the appearance of the character at a particular location is the same as the appearance of the sphere at the same location.

For example, the left side of the sphere has a bright spot 242 and the character, shown in FIG. 12, also has a bright spot 244 along the left side of the character. Similarly, the sphere has a light shadow 246 near the top of the sphere and the character 230 has a corresponding light shadow 248. Thus, in accordance with the invention, the lighting model for the character is generated by looking up the appearance of the lighting model on a particular location on a sphere and then mapping the sphere's lighting at the particular location onto the polygons of the animated character at the same particular location. In accordance with the invention, it is not necessary to calculate the lighting for each pixel of the character. In a typical three dimensional animation system, the lighting model may be transferred onto the character by calculating the lighting of each pixel on the character which is a slow process. Now, an example of a morphlink associated with the leg of a character will be described.

Figure 15:
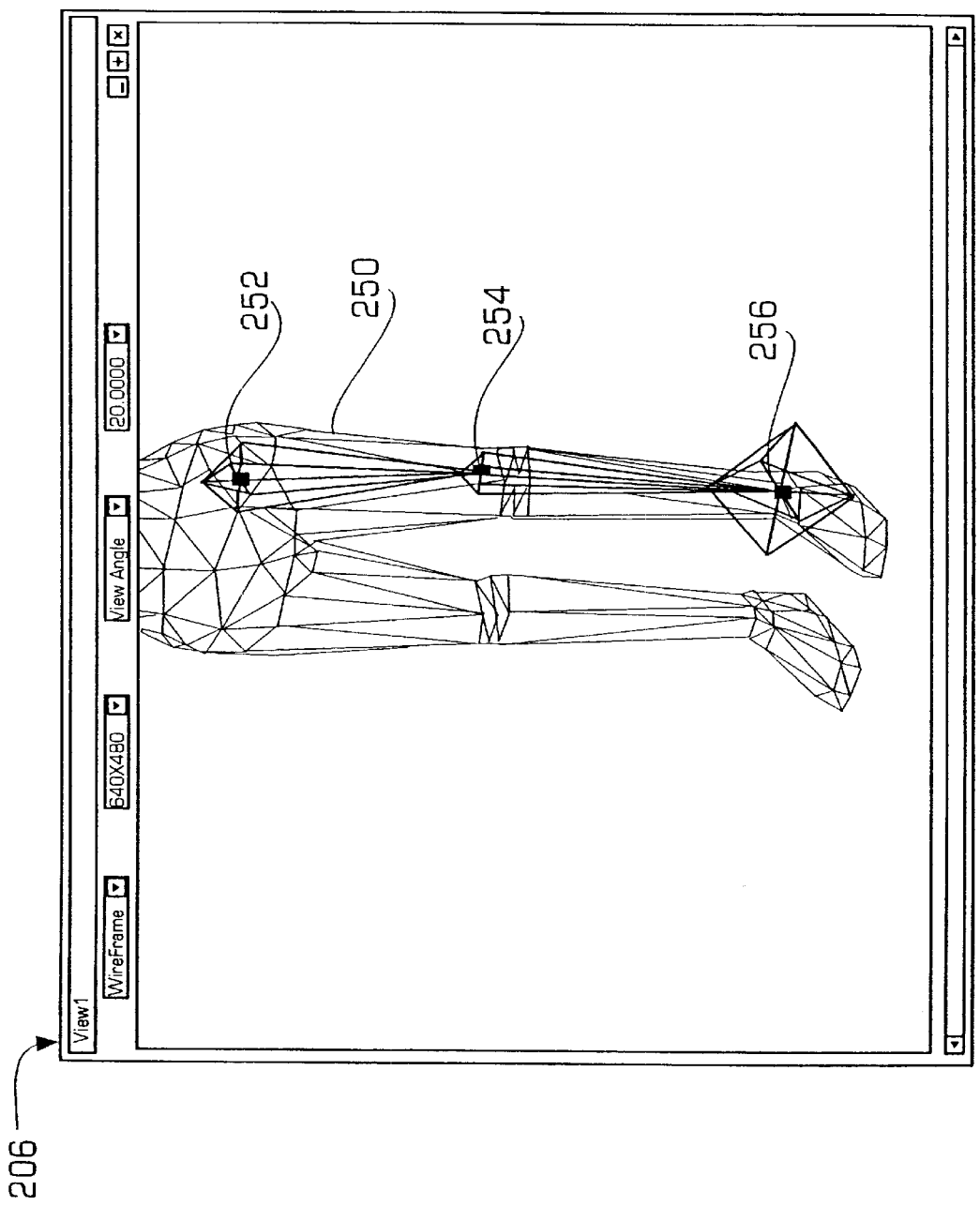
FIGS. 15 and 16 are diagrams illustrating the bones in a leg model in accordance with the invention.
Figure 16:
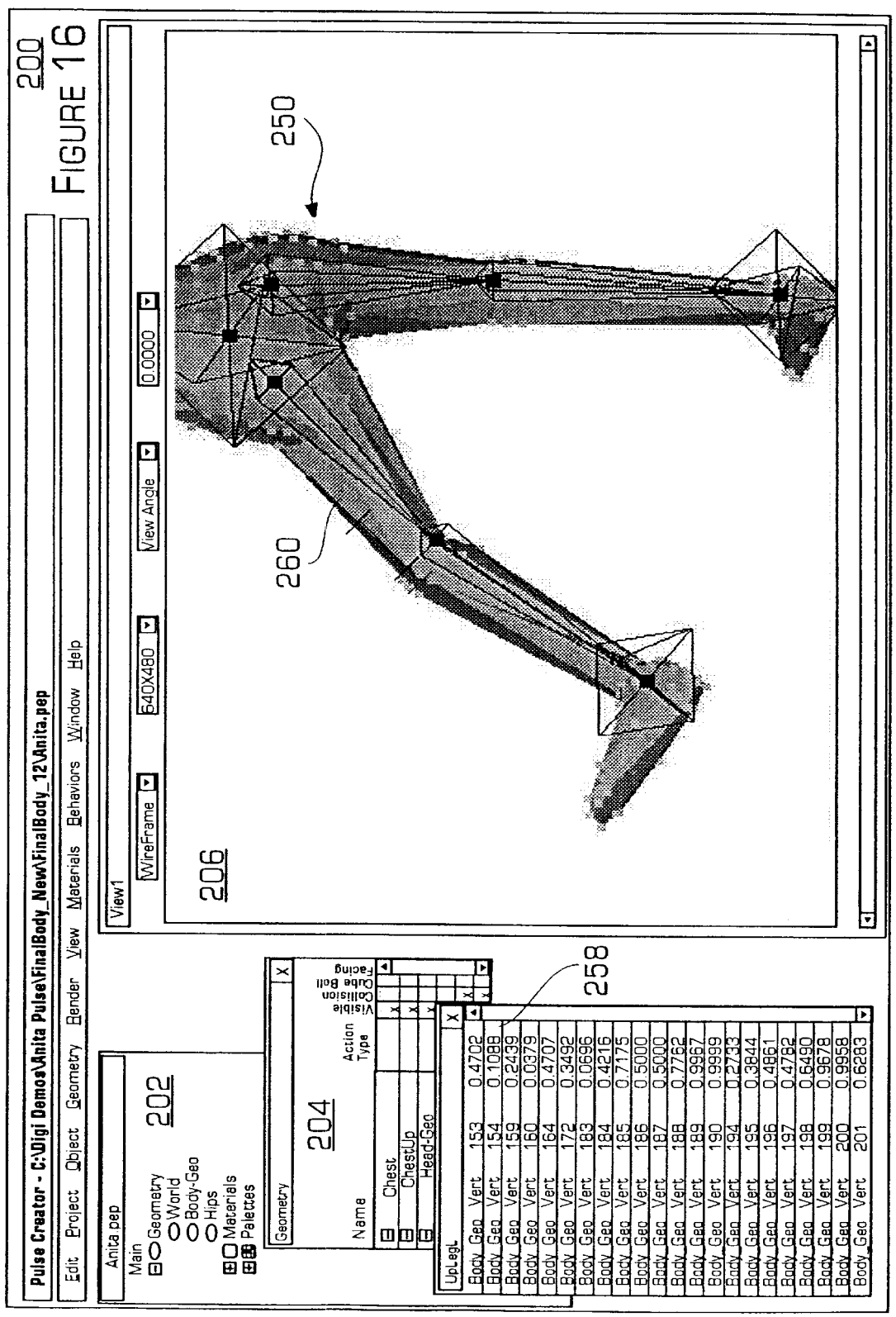

FIGS. 15 and 16 are diagrams illustrating an example of the bones in a leg and the morphlink associated with the leg in accordance with the invention. In particular, FIG. 16 shows the display window 206 of the creator with a bottom half 250 of a character. In this example, a hip joint 252, a knee joint 254 and an ankle joint 256 are shown inside of the character. Each pixel of each polygon forming the "skin" of the character may then have its motion determined by the creator of the character by setting the morphlinks that associate a particular pixel's movement with the contributions from each joint in the character.

FIG. 16 illustrates the user interface 200 with the main window 202, the geometry window 204 and the display window 206. When viewing the morphlinks in the character, the user interface may also include a morphlink window 258 which contains a list of each polygon in the character along with the contributions of each joint's movement to the movement of that polygon. In this example, the right leg has moved upwards and a polygon 260 has been selected. The morphlink window 258 may then highlight the selected polygon ($Body_{13}$ Geo Vert 188 in this example) along with the contribution from the knee joint which is 77.62% in this example. Thus, if the knee moves 10" in the positive X direction, the selected polygon moves 7.762" in the positive X direction. As described above, each polygon may be influenced by one or more joints and the contributions of each joint are added together to determine the movement of that polygon. The morphlink permits a downloaded behavior files to specify only the movement of each joint and then the player on the client computer may determine the movement of each polygon based on the movement of the joints and the morphlinks. Now, the areas of influence of a joint will be described in more detail using the character shown in FIGS. 15 and 16.

Figure 17:
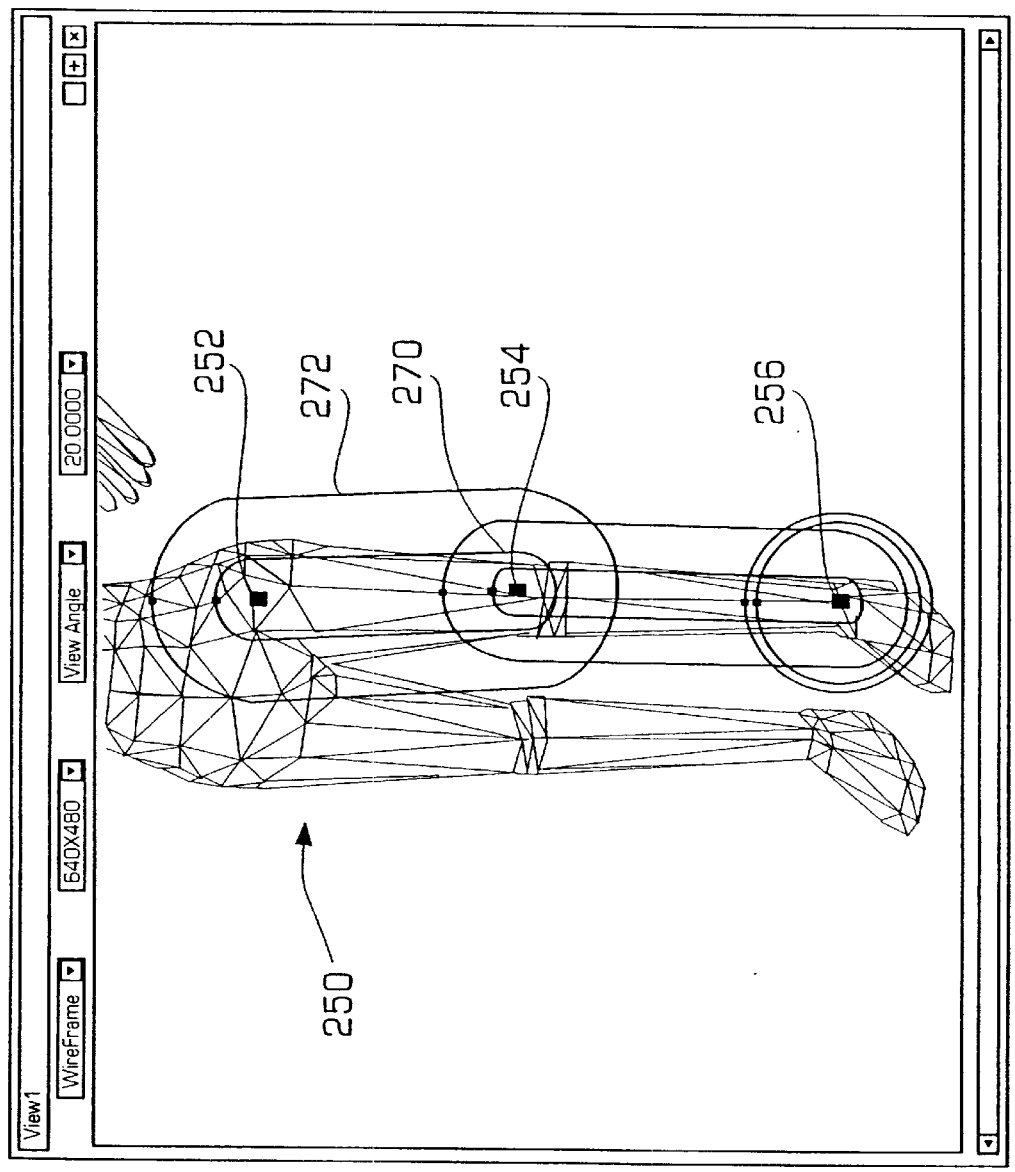
FIG. 17 is a diagram illustrating the leg of FIGS. 15 and 16 showing the area of influence for each joint.

FIG. 17 is a diagram illustrating the character 250 of FIGS. 15 and 16 showing the area of influence for each joint. The areas of influence for each joint may include an inner region 270 and an outer region 272. During the creation of a character, the user of the creator may adjust these inner and outer regions which adjusts the influence of that joint. In this example, the areas of influence for the hip joint 252, the knee joint 254 and the ankle joint 256 are shown. The details about the areas of influence are described above and will not be described here. Now, an example of a behavior will be described.

FIG. 18 is a diagram illustrating an example of a behavior 280 in accordance with the invention which may be downloaded to a client computer. As shown, the structure of the behavior may follow the structure of the objects within a character. In particular, the behavior may include a root node 282, a dance hips node 284 specifying the movement of the hips of the character during the dance behavior, a dance-rt. knee and dance-lft knee nodes 286, 288 which specify the movement of the knees during the dance behavior, etc. Thus, the objects in the behavior map to the objects in the character since the objects in the behavior specify the movement of the objects in the character. In addition to the movement, the behavior may also specify a sound track associated with the behavior. For most behaviors which occur over time, the behavior may be broken down into one or more key periods so that the movement of each object during the behavior may change at each new key period and the system may interpolate between the key periods. The behavior may also be compressed in that, if an object, such as the head, is not moving or the object is not changing its movement during the behavior, the object for the head may be left out of the behavior file since the player will assume that any joint not in a behavior file will do the same time that it was doing before. To better understand the behavior, an example of an object within the behavior will be described in more detail.

For purposes of illustration, the dance-hips object 284 will be described in more detail, although each object in the behavior may have a similar data structure even if each object moves in a different manner. Thus, for each key period (shown in FIG. 18 as 0.1 second intervals), the object 284 may specify the movement of the object in the three dimensions (X,Y,Z). As shown, the movement in each dimension may change during each key period. Between the key periods, the player may use interpolation to ensure a smooth movement. Another example of a behavior will now be described.

FIGS. 19A, 19B and 19C are diagrams illustrating another example of a behavior in accordance with the invention. In this example, the behavior is having a character's mouth form the syllable "Ah" and a corresponding sound track being played to simulate the character speaking the syllable "Ah". FIG. 19A shows a structure 290 for the behavior which may include one or more time frames 292 to ensure synchronization of the character with the behavior at each key period. Following each time frame is the data about the movement of each object in the character during that key period including the position change of each object, the orientation change of each object and the scale change of each object. FIG. 19B illustrates a behavior object 294 for the "Ah" behavior including links to each object (joint) in the mouth that is moved during the behavior. FIG. 19C illustrates a sound track 296 associated with the "Ah" behavior. In accordance with the invention, a behavior may also include a plurality of behaviors which may be selected based on various factors including a user's actions. Thus, the invention permits a class of behaviors to be downloaded to the player at one time. Now, a method for streaming behaviors in accordance with the invention will be described.

In accordance with the invention, it is desirable to begin the animation of the animated character including its behaviors as soon as possible so that the user of the player application may begin viewing the animation as soon as possible. When a large behavior file needs to be downloaded to the player application, it is possible with conventional animation systems that the animation of the animated character is delayed, which is not acceptable. For example, if a behavior contains a sound track, the sound data may be large enough that the behavior takes as long to download as it does to play. On a modem that transmits 28,800 bit per second, even compressed sound data requires 13,000 bit per second to download the sound data and the behavior key frames require the rest of the bandwidth. It is not reasonable to make a user wait five minutes for the five minute long behavior to download before it is played. In accordance with the invention, the animation system and in particular the player application may start playing a behavior while the behavior is still being downloaded to the player application which may be known as behavior streaming.

Figure 20:
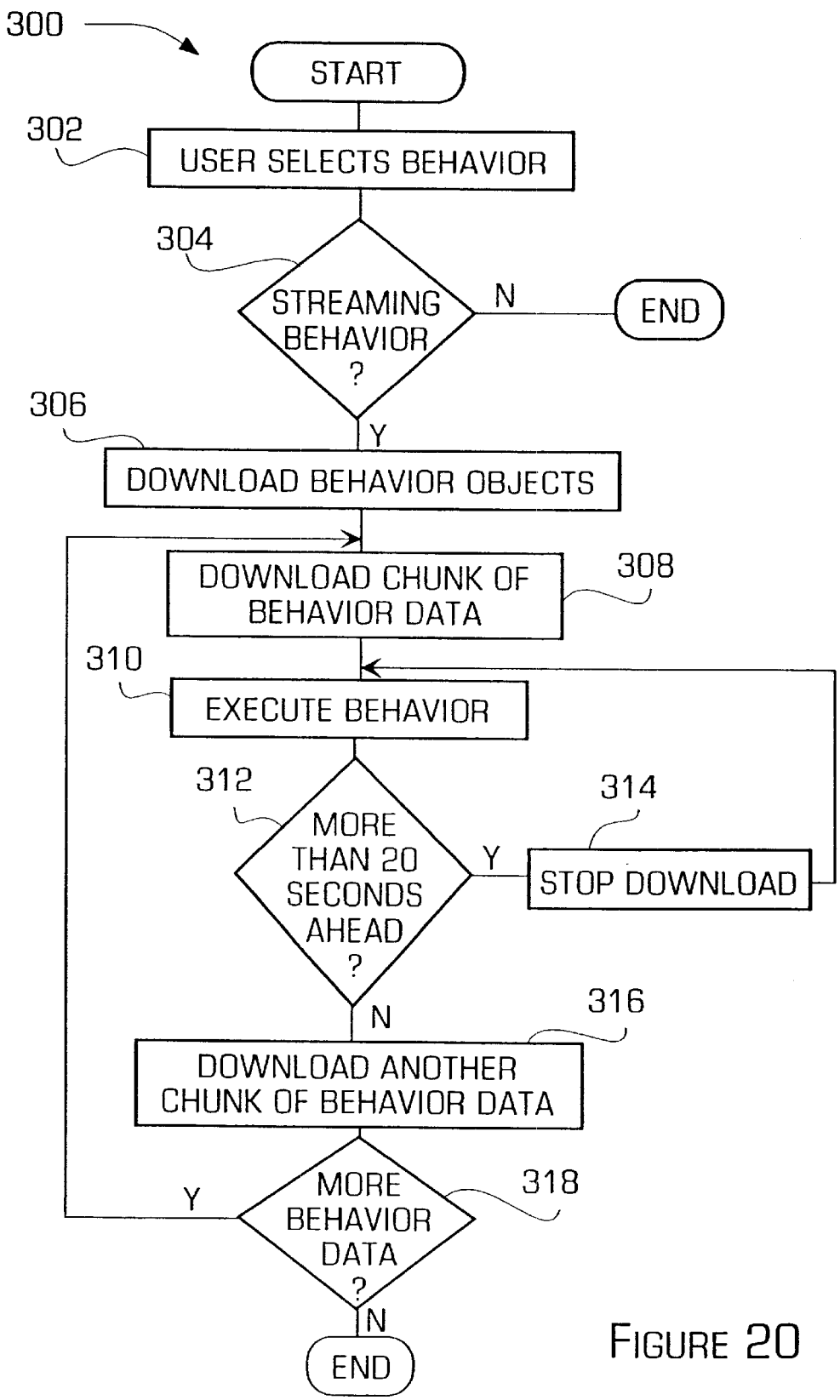
FIG. 20 is a flowchart illustrating a method for streaming behaviors in accordance with the invention.

FIG. 20 is a flowchart illustrating a method 300 for streaming behaviors in accordance with the invention. In step 302, the user may select a behavior and/or start the execution of a behavior by, for example, clicking on a button or an icon on a Web page. In step 304, the player application determines if the behavior is a streaming behavior since each behavior associated with an animated character may be identified as a streaming behavior or not. A behavior may be identified as a streaming behavior when the behavior requires more than a predetermined download time, such as when the behavior includes sound data. If the behavior is not a streaming behavior, the method is completed. If the behavior is a streaming behavior, the player application may download the behavior objects, as described below, in step 306 and downloads the first predetermined sized chunk of the behavior data in step 308. In a preferred embodiment, the chunk of behavior data may be sufficient data for ten seconds of the behavior. The rest of the behavior data may be downloaded asynchronously as the player application is executing the previously downloaded chunk of the behavior data. For a behavior that lasts a total of five minutes, the streaming behavior begins playing after only ten seconds and the rest of the behavior data may be downloaded as the behavior is being executed. In accordance with the invention, the chunk being downloaded to the player application may always be a predetermined number of seconds (ten seconds in a preferred embodiment) ahead of the currently playing portion of the behavior.

In a preferred embodiment, the predetermined chunk of behavior data downloaded before starting the behavior may be ten seconds of behavior time. The downloading of the rest of the steaming behavior data may also be ten seconds ahead of the currently playing behavior data. The ten second time takes into account that the Internet sometimes suffers congestion and therefore is delayed is delivering the behavior data. If the player application started playing the streaming behavior as soon as it was downloaded, the user may experience interruptions in the animation. Thus, the ten second interval provides a buffer of data so that the system has some ability to compensate for when the Internet is congested. For the streaming of the behavior data to work, the behavior data must be compressed so that behavior data may be downloaded from the Internet at least as fast as the player application plays the behavior data. For example, if the user uses a modem to download the behavior data, the behavior data is highly compressed so that it requires less than one second to download one second worth of behavior data.

Returning to the flowchart, after the initial chunk of behavior data is downloaded, the player application may execute the behavior in step 310. While the initial chunk of behavior is being executed, the player application may determine if the downloaded behavior data is more than a predetermined number of seconds (twenty seconds in a preferred embodiment) ahead of the behavior data currently being played in step 312. If the downloaded behavior data is more than twenty seconds ahead of the currently played behavior data, the player application may stop further downloads in step 314 until the new behavior data is less than a predetermined time (ten seconds in a preferred embodiment) ahead of the currently playing behavior data. Then, in step 316, the player application may download the next chunk of behavior data. In step 318, the player application may determine if there is more behavior data to download and either loop back to step 308 to download a next chunk of behavior data or complete the method if there is no more behavior data to be downloaded. Now, the streaming behavior files in accordance with the invention will be described.

Figure 21:
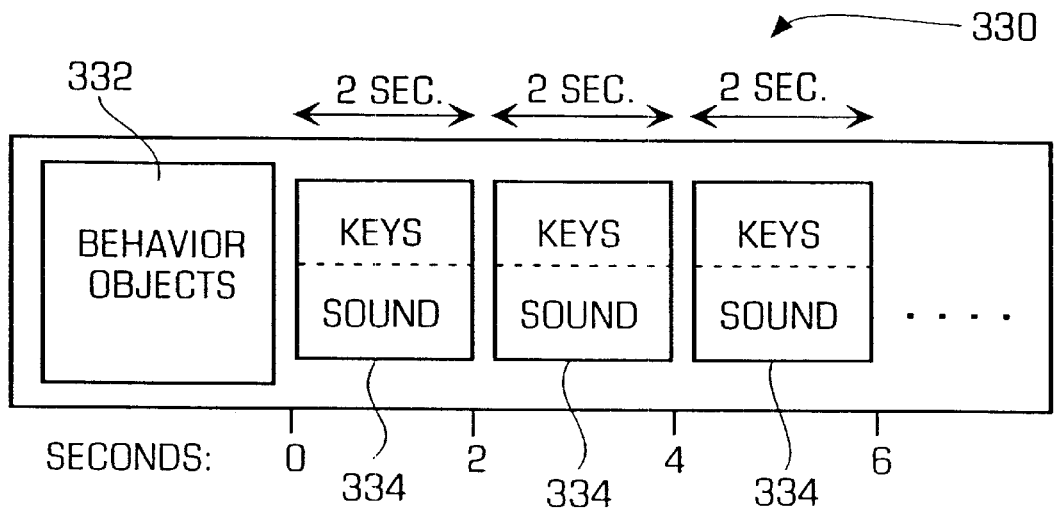
FIG. 21 is a diagram illustrating the details of the streaming behaviors in accordance with the invention.

FIG. 21 is a diagram illustrating a stream file 330 in accordance with the invention. In particular, the creator described above, may generate special files for streaming behaviors known as stream files. The stream files 330 may include behavior objects 332 and one or more chunks of key frame and sound data 334. The behavior objects may include all of the data that describes the components of the behavior, such as the geometry and the movement of each joint in the animated character during the behavior. The behavior objects does not contain any key frames of behavior data, such as sound data. Each of the one or more chunks of behavior data 334 may contain a predetermined amount of behavior data (such as two seconds of behavior data in a preferred embodiment). For example, the first chunk of behavior data may contain all of the keyframes from all of the behavior tracks which occur during the first predetermined time interval along with the sound data that plays during the first predetermined time interval of the behavior. Each chunk of behavior data starts at the same time as the corresponding time in the behavior so that the initial chunk starts at the start of the behavior. Now, an example of the structure for each chunk of behavior data will be described.

Figure 22:
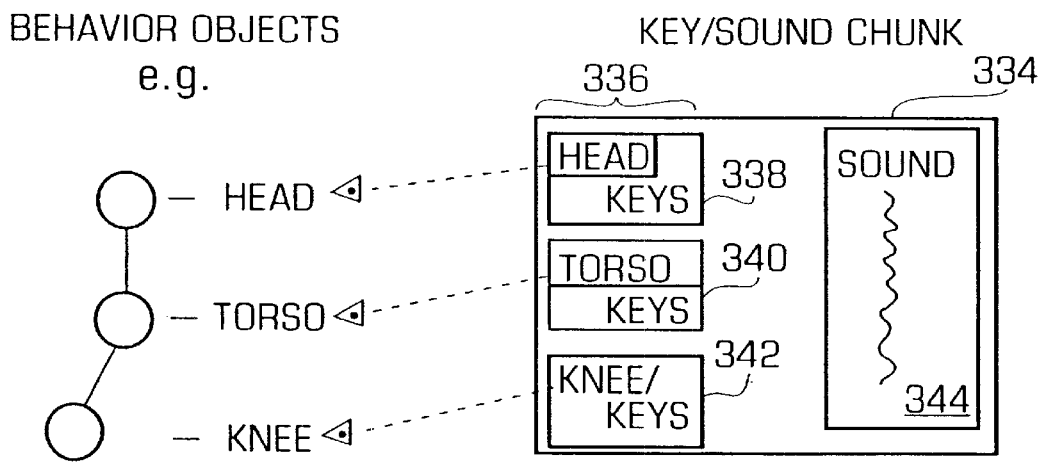
FIG. 22 is a diagram illustrating more details of the streaming behavior shown in FIG. 21.

FIG. 22 is a diagram illustrating an example of the structure of each chunk of behavior data 334. Each chunk 334 may be divided into one or more tracks 336 wherein each track contains data about a particular portion of the animated character. In this example, there is a head track 338, a torso track 340 and a knee track 342 as shown in FIG. 22 which are respectively associated with the head, torso and knee of the animated character geometry. As shown, the chunk also include the sound data 344 for that particular portion of the behavior data.

Figure 23:
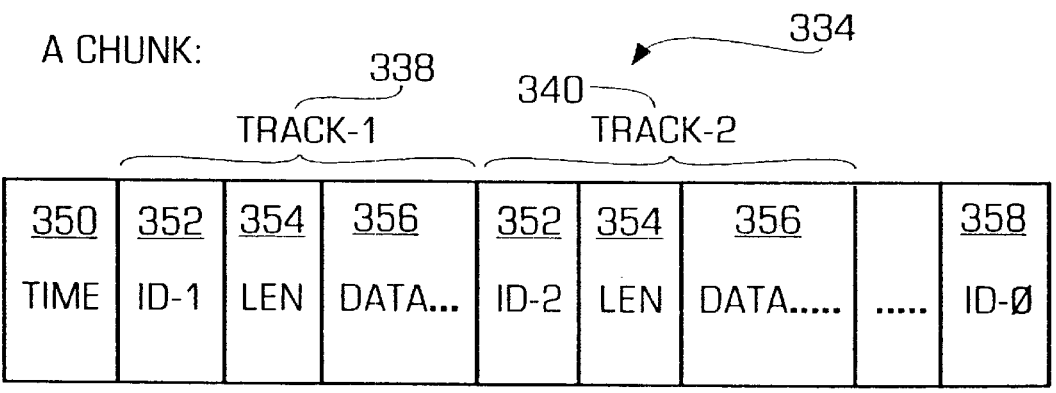
FIG. 23 is a diagram illustrating a portion of a streamed behavior in accordance with the invention.

FIG. 23 is a diagram illustrating more details of the chunk 334 of behavior data. In particular, the chunk of behavior data includes the tracks 338, 340 and a timestamp 350. The timestamp may indicate the time of the chunk within the behavior, such as that the chuck covers time t to time t+2 seconds of the behavior. Each track 338, 340 may include an identifier 352 that identifies the behavior object with which the particular track is associated, a length of data field 354 (len) indicating that length of the data in the track and a data field 356 containing the keyframe and behavior data for that track. Each chunk 334 may end with a track identification of zero (id-0) indicating the end of the particular chunk of behavior data. Now, the operation of the player will be described.

Figure 24:
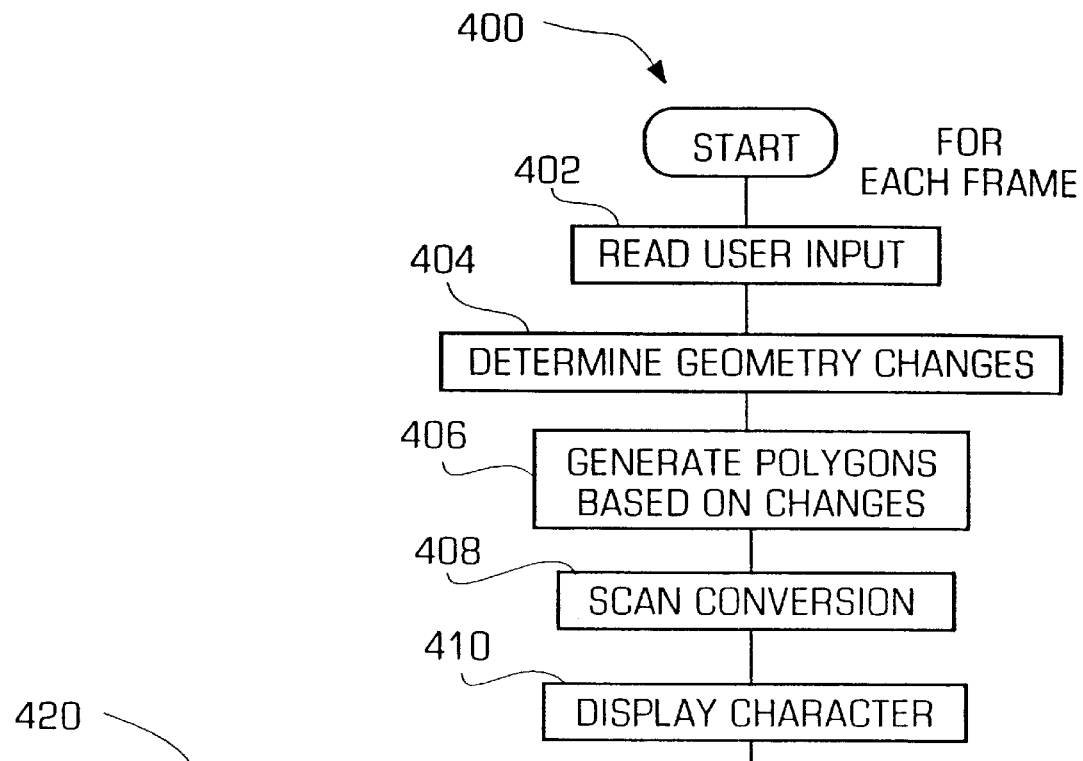
FIG. 24 and 25 are flowcharts illustrating the operation of the player in accordance with the invention.
Figure 25:
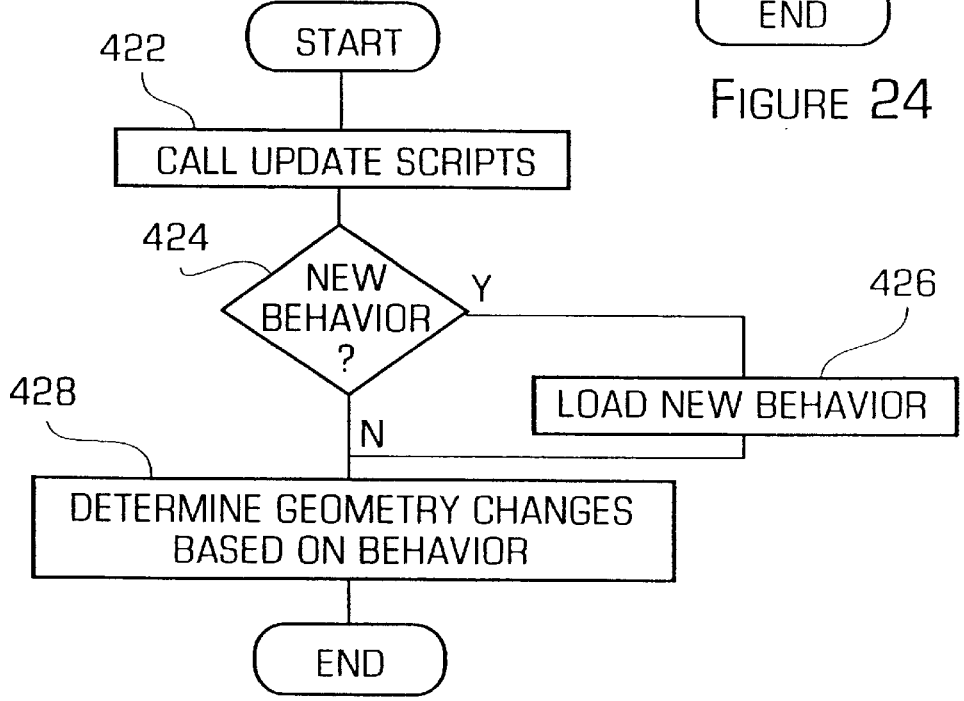

FIGS. 24 and 25 are flowcharts illustrating the operation of the player in accordance with the invention. FIG. 24 is a flowchart illustrating the operation 400 of the player for each frame of images being displayed to the user of the client computer. In step 402, the player may read any user inputs and react according to those user inputs. Next, the player may determine any geometry changes in the character in step 404 based on any currently executing behaviors. Next, the player may generate the polygons of the character in step 406 based on the above determined changes in the geometry and the morphlinks as described above. Once the polygons are generated, the data about the polygons of the character may be scan converted in step 408 so that the character and the polygons may be displayed on a display screen. In step 410, the character may be transferred to the display memory, such as by using a well known BLTBLK routine, so that it may be displayed to the user. Now, the details about determining the geometry changes will be described.

FIG. 25 is a flowchart illustrating a method 420 for determining geometry changes in accordance with the invention. In step 422, the player may call any update scripts which may include commands about the current behavior being executed. If there are no other behaviors being executed, the player may execute the idle behavior. In step 424, the player may determine if the update scripts contain any new behaviors and request the download of the new behavior in step 426 if a new behavior is needed. Next, in step 428, the player determines the geometry changes for the character based on the currently executing behavior.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A system for animating a character on a computer, comprising:

a first computer for storing one or more pieces of data associated with a particular animated character, the pieces of data including a persistent data file containing one or more of a geometric model of the animated character, a texture associated with the animated character and a sound associated with the animated character, the pieces of data further comprising one or more behavior files, each behavior file containing data about a particular behavior of the animated character, each behavior specifying the movement of the model; and a second computer connected to the first computer by a communications network, the second computer further comprising means for initially downloading the persistent data file from the server computer in order to begin the animation of the animated character and means for asynchronously downloading a behavior file from the first computer just prior to the execution of the behavior of the animated character by the second computer.

2. The system of claim 1, wherein the initially downloaded persistent data further comprises an idle behavior for the animated character, the idle behavior being executed when there is no other behavior being executed by the second computer for the animated character.

3. The system of claim 1, wherein the second computer further comprises a persistent storage device that includes a character cache that stores the persistent data about that animated character so that the persistent data is still resident on the second computer after the animation has been completed.

4. The system of claim 1, wherein the geometric model further comprises one or more joints linked together by one or more bones and a plurality of polygons forming a skin over the joints and bones and wherein the persistent data further comprises a morphlink for each polygon on the animated character, each morphlink comprising an association of the movement of the polygon to the movement of one or more joints in the geometric model so that the movement of the polygon is determined based on the movement of the one or more joints.

5. The system of claim 4, wherein the morphlink further comprises a contribution value for each joint that affects the polygon wherein the contribution values for all of the joint that affect the polygon are added together to determine the movement of the polygon.

6. The system of claim 5, wherein each joint in the geometric model further comprises an inner area of influence surrounding the joint and an outer area of influence surrounding the inner area of influence wherein the movement of the polygons within the inner area of influence is similar to the movement of the joint, the movement of the polygons outside of the inner area of influence but inside the outer area of influence is less than the movement of the joint and the movement of polygons outside of the outer area of influence is not affected by the movement of the joint.

7. The system of claim 6, wherein polygons in the outer area of influence are affected increasingly less by the movement of the joint as the polygon is located farther away from the joint.

8. The system of claim 1, wherein the persistent data further comprises a lighting environmental map for the animated character, the lighting environmental map comprising a lighting model illuminated onto a surface of a sphere so that the lighting on each polygon in a particular location on the animated character is looked up from the corresponding location on the sphere.

9. The system of claim 4, wherein the geometric model comprises an object representing each joint of the animated character and wherein the behavior files comprises an object for each joint containing data about the movement of each joint during a particular behavior, the polygons of the animated character moving based on the behavior file and the morphlinks.

10. The system of claim 9, wherein the behavior file further comprises one or more key periods during the behavior wherein each joint is able to move during each key period.

11. The system of claim 10, wherein the behavior file further comprises a sound track associated with the behavior, the sound track being synchronized to the one or more key periods.

12. The system of claim 9, wherein the behavior file further comprises a plurality of individual behaviors associated with the animated character and means, based on predetermined input, for selecting one of the individual behaviors to be executed for the animated character.

13. The system of claim 1, wherein each behavior file further comprises a stream file containing behavior data and sound data associated with a streaming behavior, and wherein the second computer further comprises means for streaming the stream file from the first computer so that the behavior associated with the stream file is executed before the entire stream file is downloaded to the second computer.

14. The system of claim 13, wherein the streaming means further comprises means for downloading a behavior object and a predetermined portion of the stream file when the behavior is selected, means, while the behavior is executing, for downloading one or more other predetermined portions of the stream file.

15. The system of claim 14, wherein the streaming means further comprises means for halting the downloading of the stream file when the behavior data being downloaded is more than a predetermined number of seconds ahead of the behavior data being executed.

16. A method for animating a character on a computer, comprising:
storing one or more pieces of data associated with a particular animated character on a first computer, the pieces of data including a persistent data file containing one or more of a geometric model of the animated character, a texture associated with the animated character and a sound associated with the animated character, the pieces of data further comprising one or more behavior files, each behavior file containing data about a particular behavior of the animated character, each behavior specifying the movement of the model;
initially downloading the persistent data file from the first computer to a second computer over a communications network so that the animation of the animated character begins on the second computer; and
asynchronously downloading a behavior file from the first computer to the second computer just prior to the execution of the behavior of the animated character by the second computer.

17. The method of claim 16, wherein the persistent data further comprises a idle behavior for the animated character, the idle behavior being excused when there is no other behavior being executed by the second computer for the animated character and wherein the idle behavior includes a movement.

18. The method of claim 16 further comprising storing the persistent data in the second computer using a persistent storage device so that the persistent data is still resident on the second computer after the animation has been completed.

19. The method of claim 16, wherein the geometric model further comprises one or more joints linked together by one or more bones and a plurality of polygons forming a skin over the joints and bones and wherein the persistent data further comprises a morphlink for each polygon on the animated character, each morphlink comprising an association of the movement of the polygon to the movement of one or more joints in the geometric model so that the movement of the polygon is determined based on the movement of the one or more joints.

20. The method of claim 19, wherein the morphlink further comprises a contribution value for each joint that affects the polygon wherein the contribution values for all of the joint that affect the polygon are added together to determine the movement of the polygon.

21. The method of claim 20, wherein each joint in the geometric model further comprises an inner area of influence surrounding the joint and an outer area of influence surrounding the inner area of influence wherein the movement of the polygons within the inner area of influence is similar to the movement of the joint, the movement of the polygons outside of the inner area of influence but inside the outer area of influence is less than the movement of the joint and the movement of polygons outside of the outer area of influence is not affected by the movement of the joint.

22. The method of claim 21, wherein polygons in the outer area of influence are affected increasingly less by the movement of the joint as the polygon is located farther away from the joint.

23. The method of claim 16, wherein the persistent data further comprises a lighting environmental map for the animated character, the lighting environmental map comprising a lighting model illuminated onto a surface of a sphere so that the lighting on each polygon in a particular location on the animated character is looked up from the corresponding location on the sphere.

24. The method of claim 19, wherein the geometric model comprises an object representing each joint of the animated character and wherein the behavior files comprises an object for each joint containing data about the movement of each joint during a particular behavior, the polygons of the animated character moving based on the behavior file and the morphlinks.

25. The method of claim 24, wherein the behavior file further comprises one or more key periods during the behavior wherein each joint is able to move during each key period.

26. The method of claim 25, wherein the behavior file further comprises a sound track associated with the behavior, the sound track being synchronized to the one or more key periods.

27. The system of claim 24, wherein the behavior file further comprises a plurality of individual behaviors associated with the animated character and means, based on predetermined input, for selecting one of the individual behaviors to be executed for the animated character.

28. The method of claim 16, wherein each behavior file further comprises a stream file containing behavior data and sound data associated with a streaming behavior and further comprising streaming the stream file from the first computer to the second computer so that the behavior associated with the stream file is executed before the entire stream file is downloaded to the second computer.

29. The method of claim 28, wherein the streaming further comprises downloading a behavior object and a predetermined portion of the stream file when the behavior is selected, and, while the behavior is executing, downloading one or more other predetermined portions of the stream file.

30. The method of claim 29, wherein the streaming further comprises halting the downloading of the stream file when the behavior data being downloaded is more than a predetermined number of seconds ahead of the behavior data being executed.

31. An apparatus for animating a character on a computer based on animation data contained on another remote computer, the apparatus comprising:

means for communicating with the remote computer in order to download the animation data from the remote computer, the animation data comprising a persistent data file containing one or more of a geometric model of the animated character, a texture associated with the animated character and a sound associated with the animated character, the animation data further comprising one or more behavior files, each behavior file containing data about a particular behavior of the animated character, each behavior specifying the movement of the model;

means for initially downloading the persistent data file from the remote computer in order to begin the animation for the animated character on the computer; and means for asynchronously downloading a behavior file for the remote computer just prior to the execution of the behavior of the animated character by the computer.

32. The apparatus of claim 31, wherein the persistent data further comprises an idle behavior for the animated character, the idle behavior being executed when there is no other behavior being executed by the second computer for the animated character and wherein the idle behavior includes a motion.

33. The apparatus of claim 31, wherein the computer further comprises a persistent storage device that includes a character cache that stores the persistent data about the animated character so that the persistent data is still resident on the computer after the animation has been completed.

34. The apparatus of claim 31, wherein the geometric model further comprises one or more joints linked together by one or more bones and a plurality of polygons forming a skin over the joints and bones and wherein the persistent data further comprises a morphlink for each polygon on the animated character, each morphlink comprising an association of the movement of the polygon to the movement of one or more joints in the geometric model so that the movement of the polygon is determined based on the movement of the one or more joints.

35. The apparatus of claim 34, wherein the morphlink further comprises a contribution value for each joint that affects the polygon wherein the contribution values for all of the joint that affect the polygon are added together to determine the movement of the polygon.

36. The apparatus of claim 35, wherein each joint in the geometric model further comprises an inner area of influence surrounding the joint and an outer area of influence surrounding the inner area of influence wherein the movement of the polygons within the inner area of influence is similar to the movement of the joint, the movement of the polygons outside of the inner area of influence but inside the outer area of influence is less than the movement of the joint and the movement of polygons outside of the outer area of influence is not affected by the movement of the joint.

37. The apparatus of claim 36, wherein polygons in the outer area of influence are affected increasingly less by the movement of the joint as the polygon is located farther away from the joint.

38. The apparatus of claim 31, wherein the persistent data further comprises a lighting environmental map for the animated character, the lighting environmental map comprising a lighting model illuminated onto a surface of a sphere so that the lighting on each polygon in a particular location on the animated character is looked up from the corresponding location on the sphere.

39. The apparatus of claim 34, wherein the geometric model comprises an object representing each joint of the animated character and wherein the behavior files comprises an object for each joint containing data about the movement of each joint during a particular behavior, the polygons of the animated character moving based on the behavior file and the morphlinks.

40. The apparatus of claim 39, wherein the behavior file further comprises one or more key periods during the behavior wherein each joint is able to move during each key period.

41. The apparatus of claim 40, wherein the behavior file further comprises a sound track associated with the behavior, the sound track being synchronized to the one or more key periods.

42. The apparatus of claim 39, wherein the behavior file further comprises a plurality of individual behaviors associated with the animated character and means, based on predetermined input, for selecting one of the individual behaviors to be executed for the animated character.

43. The apparatus of claim 31, wherein each behavior file further comprises a stream file containing behavior data and sound data associated with a streaming behavior, and wherein the second computer further comprises means for streaming the stream file from the first computer so that the behavior associated with the stream file is executed before the entire steam file is downloaded to the second computer.

44. The apparatus of claim 43, wherein the streaming means further comprises means for downloading a behavior object and a predetermined portion of the stream file when the behavior is selected, means, while the behavior is executing, for downloading one or more other predetermined portions of the stream file.

45. The apparatus of claim 44, wherein the streaming means further comprises means for halting the downloading of the stream file when the behavior data being downloaded is more than a predetermined number of seconds ahead of the behavior data being executed.

46. A server computer for downloading animation files to a remote computer connected to the server computer to animate a character on the remote computer, the server comprising:

- means for storing one or more pieces of animation data associated with a particular animated character, the animation data comprising a persistent data file containing one or more of a geometric model of the animated character, a texture associated with the animated character and a sound associated with the animated character, the pieces of data further comprising one or more behavior files, each behavior file containing data about a particular behavior of the animated character, each behavior specifying the movement of the model; and
- means, in response to a request by the remote computer, for initially downloading the persistent data file to the remote computer in order to begin the animation of the animated character on the remote computer; and
- means, in response to a request by the remote computer, for asynchronously downloading a behavior file to the remote computer just prior to the execution of the behavior of the animated character by the remote computer.

47. The server of claim 46, wherein the persistent data further comprises an idle behavior for the animated character, the idle behavior being executed when there is no other behavior being executed by the second computer for the animated character and wherein the idle behavior includes a motion.

48. The server of claim 46, wherein the second computer further comprises a persistent storage device that includes a character cache that stores the persistent data about that animated character so that the persistent data is still resident on the second computer after the animation has been completed.

49. The server of claim 46, wherein the geometric model further comprises one or more joints linked together by one or more bones and a plurality of polygons forming a skin over the joints and bones and wherein the persistent data further comprises a morphlink for each polygon on the animated character, each morphlink comprising an association of the movement of the polygon to the movement of one or more joints in the geometric model so that the movement of the polygon is determined based on the movement of the one or more joints.

50. The server of claim 49, wherein the morphlink further comprises a contribution value for each joint that affects the polygon wherein the contribution values for all of the joint that affect the polygon are added together to determine the movement of the polygon.

51. The server of claim 50, wherein each joint in the geometric model further comprises an inner area of influence surrounding the joint and an outer area of influence surrounding the inner area of influence wherein the movement of the polygons within the inner area of influence is similar to the movement of the joint, the movement of the polygons outside of the inner area of influence but inside the outer area of influence is less than the movement of the joint and the movement of polygons outside of the outer area of influence is not affected by the movement of the joint.

52. The server of claim 51, wherein polygons in the outer area of influence are affected increasingly less by the movement of the joint as the polygon is located farther away from the joint.

53. The server of claim 46, wherein the persistent data further comprises a lighting environmental map for the animated character, the lighting environmental map comprising a lighting model illuminated onto a surface of a sphere so that the lighting on each polygon in a particular location on the animated character is looked up from the corresponding location on the sphere.

54. The server of claim 49, wherein the geometric model comprises an object representing each joint of the animated character and wherein the behavior files comprises an object for each joint containing data about the movement of each joint during a particular behavior, the polygons of the animated character moving based on the behavior file and the morphlinks.

55. The server of claim 54, wherein the behavior file further comprises one or more key periods during the behavior wherein each joint is able to move during each key period.

56. The server of claim 55, wherein the behavior file further comprises a sound track associated with the behavior, the sound track being synchronized to the one or more key periods.

57. The server of claim 54, wherein the behavior file further comprises a plurality of individual behaviors associated with the animated character and means, based on predetermined input, for selecting one of the individual behaviors to be executed for the animated character.

58. A computer implemented system for generating a animated character using animation data, the animation data comprising:

- a persistent data file containing a geometric model of the animated character comprising one or more joints linked together by one or more bones, a plurality of polygons forming a skin over the joints and bones of the animated character, and a morphlink for each polygon on the animated character, each morphlink comprising an association of the movement of the polygon to the movement of one or more joints in the geometric model so that the movement of the polygon is determined based on the movement of the one or more joints; and
- one or more behavior files, each behavior file containing data about a particular behavior of the animated character and specifying the movement of one or more joints in the animated character during the behavior wherein the movement of the polygons on the animated character during a behavior are determined by the behavior file and the morphlinks.

59. The system of claim 58, wherein the morphlink further comprises a contribution value for each joint that affects the polygon wherein the contribution values for all of the joint that affect the polygon are added together to determine the movement of the polygon.

60. The system of claim 59, wherein each joint in the geometric model further comprises an inner area of influence surrounding the joint and an outer area of influence surrounding the inner area of influence wherein the movement of the polygons within the inner area of influence is similar to the movement of the joint, the movement of the polygons outside of the inner area of influence but inside the outer area of influence is less than the movement of the joint and the movement of polygons outside of the outer area of influence is not affected by the movement of the joint.

61. The system of claim 60, wherein polygons in the outer area of influence are affected increasingly less by the movement of the joint as the polygon is located farther away from the joint.

62. A computer implemented system for generating a animated character using animation data, the animation data comprising:

a persistent data file containing a geometric model of the animated character comprising one or more joints linked together by one or more bones, a plurality of polygons forming a skin over the joints and bones of the animated character, and a morphlink for each polygon on the animated character, each morphlink comprising an association of the movement of the polygon to the movement of one or more joints in the geometric model so that the movement of the polygon is determined based on the movement of the one or more joints; and one or more behavior files, each behavior file containing data about a particular behavior of the animated character and specifying the movement of one or more joints in the animated character during the behavior wherein the movement of the polygons on the animated character during a behavior are determined by the behavior file and the morphlinks.

63. A computer implemented system for generating a animated character using animation data, the animation data comprising:

a persistent data file containing information about the animated character including the joints in the animated character; and one or more behavior files, each behavior file containing data about a particular behavior of the animated character and specifying the movement of the animated character during the behavior, each behavior file comprising behavior objects containing data about the movement of the animated character and one or more chunks of data associated with predetermined portions of the behavior, each chunk comprising one or more tracks containing behavior data associated with each of joints of the animated character.

64. A system for animating a character on a computer, comprising:

a first computer for storing one or more pieces of data associated with a particular animated character, the pieces of data including a persistent data file and one or more behavior files, each behavior file containing data about a particular behavior of the animated character comprising behavior objects and one or more chunks of data associated with predetermined portions of the behavior; and a second computer connected to the first computer by a communications network, the second computer further comprising means for initially downloading the persistent data file from the server computer in order to begin the animation of the animated character and means for downloading a behavior file from the first computer just prior to the execution of the behavior of the animated character by the second computer, the behavior downloading further comprising means for initially downloading the behavior objects and a first chunk of the behavior data in order to execute the behavior, and means, while the behavior is executing, for asynchronously downloading the other chunks of the behavior data.

65. The system of claim 1, the second computer further comprising:

a data storage for storing the downloaded data; and an instruction for deleting data that are less likely to be reused than a newly downloaded data if the deleting is necessary to make room to store the newly downloaded data.

66. The method of claim 16, wherein the downloaded behavior file is a new behavior file, further comprising:

storing the new behavior file in a data storage; and deleting at least one behavior file that is less likely to be reused than the new behavior file if the deleting is necessary to store the new behavior file.

67. The apparatus of claim 31, further comprising:

a data storage for storing the downloaded behavior files; and an instruction for deleting files that are less likely to be reused than a newly downloaded file if the deleting is necessary to make room to store the newly downloaded file.

68. A system for animating a character on a computer, comprising:

a first computer for storing one or more pieces of data associated with a particular animated character, the pieces of data including a persistent data file containing one or more of a geometric model of the animated character, a texture associated with the animated character and a sound associated with the animated character, the pieces of data further comprising one or more behavior files, each behavior file containing data about a particular behavior of the animated character, each behavior specifying the movement of the model; and a second computer connected to the first computer by a communications network, the second computer further comprising an instruction for asynchronously downloading one or more pieces of data from the first computer.

69. The system of claim 68, wherein the asynchronously downloaded piece of data includes a persistent data file.

70. A method for animating a character on a computer, comprising:

storing one or more pieces of data associated with a particular animated character on a first computer, the pieces of data including a persistent data file containing one or more of a geometric model of the animated character, a texture associated with the animated character and a sound associated with the animated character, the pieces of data further comprising one or more behavior files, each behavior file containing data about a particular behavior of the animated character, each behavior specifying the movement of the model; and asynchronously downloading pieces of data from the first computer to a second computer over a communications network.

71. The system of claim 70, wherein the asynchronously downloaded pieces of data include a persistent data file.

72. A software product for animating a character on a computer based on animation data contained on another remote computer, the apparatus comprising:

an instruction for communicating with the remote computer in order to download the animation data from the remote computer, the animation data comprising a persistent data file containing one or more of a geometric model of the animated character, a texture associated with the animated character and a sound associated with the animated character, the animation data further comprising one or more behavior files, each behavior file containing data about a particular behavior of the animated character, each behavior specifying the movement of the model; and an instruction for asynchronously downloading the animation data from the remote computer onto a storage device.

73. The software product of claim 72, wherein the asynchronously downloaded animation data includes a persistent data file.

74. The system of claim 1, wherein the geometric model farther comprises one or more joints linked together by one or more bones and a plurality of polygons forming a skin over the joints and bones and wherein the persistent data further comprises a morphlink for each polygon on the animated character such that each morphlink is associated with at least one polygon, each morphlink comprising a coordinate system and weighted contributions defining the movement of the polygons in the coordinate system.

75. The method of claim 16, wherein the geometric model further comprises one or more joints linked together by one or more bones and a plurality of polygons forming a skin over the joints and bones and wherein the persistent data further comprises a morphlink for each polygon on the animated character such that each morphlink is associated with at least one polygon, each morphlink comprising a coordinate system and weighted contributions defining the movement of the polygons in the coordinate system.

76. The apparatus of claim 31, wherein the geometric model further comprises one or more joints linked together by one or more bones and a plurality of polygons forming a skin over the joints and bones and wherein the persistent data further comprises a morphlink for each polygon on the animated character such that each morphlink is associated with at least one polygon, each morphlink comprising a coordinate system and weighted contributions defining the movement of the polygons in the coordinate system.

77. The server of claim 46, wherein the geometric model further comprises one or more joints linked together by one or more bones and a plurality of polygons forming a skin over the joints and bones and wherein the persistent data further comprises a morphlink for each polygon on the animated character such that each morphlink is associated with at least one polygon, each morphlink comprising a coordinate system and weighted contributions defining the movement of the polygons in the coordinate system.

78. The system of claim 1, wherein the pieces of data further comprise update scripts including commands about a behavior.

79. The method of claim 16, wherein the pieces of data further comprise update scripts including commands about a behavior.

80. The apparatus of claim 31, wherein the animation data comprises update scripts including commands about a behavior.

81. The server computer of claim 46, wherein the animation data comprises update scripts including commands about a behavior.

82. A system for animating a character on a computer, comprising:
a first computer for storing at least one persistent data file associated with an animated character and at least one behavior file associated with the animated character, at least one of the persistent data file and the behavior file containing data about a particular behavior of the animated character; and
a second computer connected to the first computer by a communications network, the second computer comprising an instruction for initially downloading the persistent data file from the server computer in order to begin the animation of the animated character and an instruction for asynchronously downloading a behavior file from the first computer in anticipation of the execution of the behavior of the animated character by the second computer.

83. The system of claim 82, wherein the persistent data file contains a certain number of behavior segments and the behavior file contains commands to execute at least one of the behavior segments.

84. A method for animating a character on a computer, comprising:
storing one or more pieces of data associated with a particular animated character on a first computer, the pieces of data including a persistent data file and behavior files, at least one of the persistent data file and the behavior files containing data about a particular behavior of the animated character;
initially downloading the persistent data file from the first computer to a second computer over a communications network so that the animation of the animated character begins on the second computer; and
asynchronously downloading a behavior file from the first computer to the second computer in anticipation of the execution of the behavior of the animated character by the second computer.

85. The method of claim 84, wherein the persistent data file contains a certain number of behavior segments and the behavior file contains commands to execute at least one of the behavior segments.

86. A software product for animating a character on a computer based on animation data contained on another remote computer, the apparatus comprising:
an instruction for communicating with the remote computer in order to download the animation data from the remote computer, the animation data comprising a persistent data file and at least one behavior file, at least one of the persistent data file and the behavior files containing data about a particular behavior of an animated character;
an instruction for initially downloading the persistent data file from the remote computer in order to begin the animation of the animated character on the computer; and
an instruction for asynchronously downloading a behavior file from the remote computer in anticipation of the execution of the behavior of the animated character by the computer.

87. The software product of claim 86, wherein the persistent data file contains a certain number of behavior segments and the behavior file contains commands to execute at least one of the behavior segments.

88. A server computer for downloading animation files to a remote computer connected to the server computer to animate a character on the remote computer, the server comprising:
an instruction for storing one or more pieces of animation data associated with a particular animated character, the animation data comprising a persistent data file and at least one behavior file, at least one of the persistent data file and the behavior file containing data about a particular behavior of the animated character; and
an instruction for initially downloading the persistent data file to the remote computer in response to a request by the remote computer, in order to begin the animation of the animated character on the remote computer; and
an instruction for asynchronously downloading a behavior file to the remote computer in anticipation of the execution of the behavior of the animated character by the remote computer, in response to a request by the remote computer.

89. The server of claim 88, wherein the persistent data file contains a certain number of behavior segments and the behavior file contains commands to execute at least one of the behavior segments.

90. The system of claim 4, wherein the behavior file contains joint movement data about the movement of each joint in the model so that the second computer combines the morphlink in the persistent data with the joint movement data to execute a behavior.

91. The system of claim 1, wherein the persistent file further contains program commands in the form of scripts.

92. The system of claim 15, wherein the persistent data file further contains program commands in the form of scripts.

93. The apparatus of claim 31, wherein the persistent data file further contains program commands in the form of scripts.

94. The server of claim 46, wherein the persistent data file further contains program commands in the form of scripts.

95. The system of claim 3, wherein some of the pieces of data are manually identified as persistent data.

96. The method of claim 18, wherein some of the pieces of data are manually identified as persistent data.

97. The apparatus of claim 31, wherein some of the animation data are manually identified as persistent data.

98. The server computer of claim 46, wherein some of the pieces of data are manually identified as persistent data.

* * * * *

UNITED STATES PATENT AND TRADEMARK OFFICE
CERTIFICATE OF CORRECTION

| | | |
|---|---|---|
| PATENT NO. | : 6,559,845 B1 | Page 1 of 1 |
| APPLICATION NO. | : 09/330681 | |
| DATED | : May 6, 2003 | |
| INVENTOR(S) | : Young Harvill and Richard Bean | |

It is certified that error appears in the above-identified patent and that said Letters Patent is hereby corrected as shown below:

On the Title Pg, Item (56), under "U.S. PATENT DOCUMENTS", after "5,880,731 A * 3/1999 Liles et al. ............... 345/349", insert the following --5,912,675 A 6/1999 Laperriere ............... 345/473--

On the Title Pg, Item (56), after "JP 11-102450 4/1999", insert the following
--OTHER PUBLICATIONS
Naka et al., "A Compression/Decompression Method for Streaming Based Humanoid Animation", Virtual Reality Modeling Language Symposium, Proceedings, 23-26 February, 1999, p. 65, right col., lines 1-10, Figure 2; "Painting Environment Maps Through Reverse Ray-Tracing", IBM Technical, Disclosure Bulletin, September 1991, Vol. 34, No. 4B, pp. 436-437--

Signed and Sealed this

Twenty-fifth Day of May, 2010

David J. Kappos
*Director of the United States Patent and Trademark Office*